United States Patent
Muramatsu

(10) Patent No.: US 8,449,198 B2
(45) Date of Patent: *May 28, 2013

(54) ROLLING BEARING, HUB UNIT, ROLLING CONTACT MEMBER, UNIVERSAL JOINT, TORQUE TRANSMISSION MEMBER FOR UNIVERSAL JOINT, AND METHOD OF PRODUCING THE SAME

(75) Inventor: Katsutoshi Muramatsu, Kuwana (JP)

(73) Assignee: NTN Corporation, Osaka (JP)

( * ) Notice: Subject to any disclaimer, the term of this patent is extended or adjusted under 35 U.S.C. 154(b) by 378 days.

This patent is subject to a terminal disclaimer.

(21) Appl. No.: 12/520,430

(22) PCT Filed: Nov. 26, 2007

(86) PCT No.: PCT/JP2007/072758
§ 371 (c)(1),
(2), (4) Date: Jun. 19, 2009

(87) PCT Pub. No.: WO2008/075535
PCT Pub. Date: Jun. 26, 2008

(65) Prior Publication Data
US 2010/0022313 A1    Jan. 28, 2010

(30) Foreign Application Priority Data

Dec. 20, 2006 (JP) ................. 2006-343160
Dec. 22, 2006 (JP) ................. 2006-346365
Dec. 26, 2006 (JP) ................. 2006-350329
Jun. 27, 2007 (JP) ................. 2007-169462
Jun. 29, 2007 (JP) ................. 2007-172890

(51) Int. Cl.
*F16C 33/32* (2006.01)

(52) U.S. Cl.
USPC .... 384/492; 384/910; 29/898.15; 29/DIG. 31

(58) Field of Classification Search
USPC .................. 384/492, 907.1, 910; 29/898.06, 29/898.13–898.15, DIG. 25, DIG. 31; 264/683
See application file for complete search history.

(56) References Cited

U.S. PATENT DOCUMENTS 4,127,416 A    11/1978  Lumby et al.
4,280,973 A     7/1981  Moskowitz et al.
(Continued)

FOREIGN PATENT DOCUMENTS

CN    1534212 A   10/2004
CN    2799293 Y    7/2006
(Continued)

OTHER PUBLICATIONS

European Search Report issued in European Patent Application No. 07 83 2483, mailed Jan. 26, 2011.
(Continued)

*Primary Examiner* — Gregory Binda
(74) *Attorney, Agent, or Firm* — McDermott Will & Emery LLP

(57) ABSTRACT

A deep-grooved ball bearing including a rolling contact member formed of a sintered β-sialon inexpensive and capable of reliably ensuring sufficient durability includes an outer ring and an inner ring, and a plurality of balls arranged in contact with the outer ring and the inner ring on an annular raceway. The ball is configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity.

18 Claims, 10 Drawing Sheets

U.S. PATENT DOCUMENTS

| | | | |
|---|---|---|---|
| 5,538,558 | A | 7/1996 | Ookouchi et al. |
| 5,718,519 | A * | 2/1998 | Ookouchi et al. ......... 384/907.1 |
| 5,965,471 | A | 10/1999 | Brandt et al. |
| 6,043,176 | A | 3/2000 | Brandt et al. |
| 2002/0003228 | A1 | 1/2002 | Niwa et al. |
| 2005/0224763 | A1 | 10/2005 | Komatsu et al. |
| 2007/0151633 | A1 | 7/2007 | Ohki et al. |
| 2008/0159905 | A1 * | 7/2008 | Watanabe et al. |
| 2009/0023577 | A1 | 1/2009 | Oda |
| 2010/0022313 | A1 | 1/2010 | Muramatsu |
| 2010/0189385 | A1 * | 7/2010 | Muramatsu ................... 384/492 |

FOREIGN PATENT DOCUMENTS

| | | |
|---|---|---|
| CN | 1864012 (A) | 11/2006 |
| DE | 39 38 644 A1 | 5/1990 |
| DE | 197 46 286 A1 | 4/1999 |
| EP | 0 556 833 A1 | 8/1993 |
| EP | 1 829 844 A1 | 9/2007 |
| EP | 2098482 A1 | 9/2009 |
| EP | 2 123 924 A1 | 11/2009 |
| JP | 58-52949 (B) | 11/1983 |
| JP | 59-199581 (A) | 11/1984 |
| JP | 3-98334 | 10/1991 |
| JP | 4-290613 | 10/1992 |
| JP | 5-096486 U | 12/1993 |
| JP | 2007-138722 (A) | 5/1995 |
| JP | 10-36174 (A) | 2/1998 |
| JP | 2000-009146 A | 1/2000 |
| JP | 2001-192258 (A) | 7/2001 |
| JP | 2001-294478 A | 10/2001 |
| JP | 2002-295477 (A) | 10/2002 |
| JP | 2003-013965 A | 1/2003 |
| JP | 2003-322154 | 11/2003 |
| JP | 2004-091272 | 3/2004 |
| JP | 2005-075652 | 3/2005 |
| JP | 2005-194154 | 7/2005 |
| JP | 2007-132486 A | 5/2007 |
| JP | 2007-182334 A | 7/2007 |
| JP | 2008-162851 | 7/2008 |
| JP | 2008-162851 A | 7/2008 |
| JP | 2009-008228 A | 1/2009 |
| WO | WO-2006/057232 A1 | 6/2006 |
| WO | WO-2008/075535 A1 | 6/2008 |

OTHER PUBLICATIONS

Chinese Office Action, w/ English translation thereof, issued in Chinese Patent Application No. CN 200780047380.2 dated Sep. 10, 2010.

English Language Translation of Japanese Office Action issued in Japanese Patent Application No. 2007-169462, mailed Oct. 27, 2009.

European Search Report issued in European Patent Application No. 08764906.7-1523, mailed May 19, 2011.

Chinese Office Action, with English translation thereof, issued in Chinese Patent Application No. 200880022409.6, dated Jun. 24, 2011.

Chinese Office Action, w/ English translation thereof, issued in Chinese Patent Application No. CN 200880112439.6 dated Feb. 14, 2012.

Extended European Search Report, issued in European Patent Application No. 09 766 674.7, dated Dec. 29, 2011.

United States Office Action issued in U.S. Appl. No. 12/666,217 dated May 10, 2012.

United States Office Action issued in U.S. Appl. No. 12/738,517 dated Jun. 12, 2012.

United States Office Action issued in U.S. Appl. No. 13/233,683 dated Jan. 30, 2012.

United States Office Action issued in U.S. Appl. No. 13/233,683 dated May 17, 2012.

Chinese Office Action issued in Chinese Patent Application No. CN 20111033226.8 dated May 2, 2012.

United States Notice of Allowance issued in U.S. Appl. No. 12/738,517 mailed Sep. 26, 2012.

Chinese Office Action, w/English Translation thereof issued in Chinese Patent No. 200980123538.9 dated Sep. 29, 2012.

Japanese Office Action, w/English Translation thereof issued in Japanese Patent No. 2007-169462 dated Oct. 2, 2012.

Japanese Office Action, w/English Translation thereof issued in Japanese Patent No. 2007-169463 dated Oct. 16, 2012.

Japanese Office Action, w/English Translation thereof issued in Japanese Patent No. 2007-172323 dated Oct. 16, 2012.

Japanese Office Action, w/English Translation thereof issued in Japanese Patent No. 2007-172337 dated Oct. 16, 2012.

Japanese Office Action, w/English Translation thereof issued in Japanese Patent No. 2007-172890 dated Oct. 16, 2012.

Watanabe, Outline and Future Prospect of Mass Production by Direct Synthesis of Ultrafine Powdery Meramix w/full English Abstract, Material Stage, vol. 7 No. I, pp. 99-102, 2007.

European Office Action issued in European Application No. 08764906.7 dated Feb. 14, 2013.

International Syalons: "What are SiAION Ceramics?", www.sialon.com, Feb. 1, 2013, pp. 1-2, Retrieved from the Internet: URL:http://www.syalons.com/resources/downloads/sialons.pdf [retrieved on Feb. 1, 2013].

Japanese Notification of Reasons of Refusal issued in 2007-169463, dated Oct. 10, 2012.

U.S. Appl. No. 12/666,217 dated Dec. 28, 2012.

* cited by examiner

POWDERY β-SIALON PREPARATION STEP
↓
MIXTURE STEP
↓
SHAPING STEP
↓
STEP OF FORMING BEFORE SINTERING
↓
SINTERING STEP
↓
FINISHING STEP 0.2mm

US 8,449,198 B2

ROLLING BEARING, HUB UNIT, ROLLING CONTACT MEMBER, UNIVERSAL JOINT, TORQUE TRANSMISSION MEMBER FOR UNIVERSAL JOINT, AND METHOD OF PRODUCING THE SAME

RELATED APPLICATIONS

This application is the U.S. National Phase under 35 U.S.C. §371 of International Application No. PCT/JP2007/072758, filed on Nov. 26, 2007, which in turn claims the benefit of Japanese Application Nos. 2006-343160, filed on Dec. 20, 2006; 2006-346365, filed on Dec. 22, 2006; 2006-350329, filed on Dec. 26, 2006; 2007-169462, filed on Jun. 27, 2007 and 2007-172890, filed on Jun. 29, 2007, the disclosures of which Applications are incorporated by reference herein.

TECHNICAL FIELD

The present invention relates generally to rolling bearings, hub units, rolling contact members, universal joints, torque transmission members for universal joints and methods of producing the same, and particularly to rolling bearings, hub units and universal joints that adopt for a component a sintered body containing $\beta$-sialon as a main component, rolling contact members, torque transmission members for universal joints that are formed of a sintered body containing $\beta$-sialon as a main component, and methods of producing the same.

BACKGROUND ART

Silicon nitride, sialon and similar ceramics characteristically not only have a smaller specific gravity and are more corrosive-resistant than steel but are also insulating. Accordingly, if ceramics are adopted as a source material for a component of rolling bearings (including hub units) including a race member and a rolling element, or a component of a universal joint including a race member and a torque transmission member, such as a race member, a rolling element, a torque transmission member, they can provide bearings, universal joints and the like reduced in weight and also prevent rolling bearings and universal joints from having short life as their components corrode and are thus damaged or electrolytically corrode.

Furthermore, a hub unit, which is a type of rolling bearing, is often used in an environment having a possibility of receiving moisture therein and hence having insufficient lubricity. Ceramic rolling elements, race members and similar rolling contact members are characteristically less damageable in such an insufficiently lubricating environment as above. Accordingly, for example, a hub unit with a rolling contact member formed with ceramics adopted as a source material can exhibit improved durability when it is employed in an insufficiently lubricating environment.

Furthermore, a universal joint has a torque transmission member rolling and stopping repeatedly on a surface of a race member, and between the torque transmission member and the race member there is not sufficient oil film provided. Furthermore, a universal joint is often used in an environment having a possibility of receiving moisture therein and hence having insufficient lubricity. A ceramic torque transmission member is characteristically less damageable in such an insufficiently lubricating environment as above. Accordingly, for example, a universal joint with a torque transmission member formed with ceramics adopted as a source material can exhibit improved durability when it is employed in an insufficiently lubricating environment.

However, silicon nitride, sialon and similar ceramics require higher production cost than steel, and adopting ceramics as a source material for components of rolling bearings and universal joints disadvantageously increases their production costs.

In recent years, there has been developed a method of producing $\beta$-sialon, a type of ceramics, inexpensively by adopting a production process including combustion synthesis (Japanese Patent Laying-open No. 2004-91272 (Patent Document 1), Japanese Patent Laying-open No. 2005-75652 (Patent Document 2) and Japanese Patent Laying-open No. 2005-194154 (Patent Document 3)). This allows one to consider adopting $\beta$-sialon as a source material for components of rolling bearings, universal joints and the like to produce them inexpensively.

Patent Document 1: Japanese Patent Laying-open No. 2004-91272

Patent Document 2: Japanese Patent Laying-open No. 2005-75652

Patent Document 3: Japanese Patent Laying-open No. 2005-194154

DISCLOSURE OF THE INVENTION

Problems to be Solved by the Invention

To adopt the above $\beta$-sialon as a source material for a component of a rolling bearing, however, the component of the rolling bearing that is formed of $\beta$-sialon must have a sufficient rolling contact fatigue life. Rolling contact fatigue life does not necessarily match a member's fracture strength, and it cannot be said that a component of a rolling bearing that is formed of $\beta$-sialon necessarily has a sufficient rolling contact fatigue life. Thus it has not been easy either to ensure that a rolling bearing including a component formed of $\beta$-sialon reliably has sufficient durability.

Furthermore, to adopt the above $\beta$-sialon as a source material for a torque transmission member of a universal joint, however, the torque transmission member of the universal joint that is formed of $\beta$-sialon must have sufficient durability. More specifically, the universal joint has the torque transmission member sliding on a raceway and therewhile rolling thereon as the universal joint operates. Accordingly the torque transmission member receives rolling and sliding contact fatigue. Durability against rolling and sliding contact fatigue does not necessarily match the torque transmission member's fracture strength and the like, and it cannot be said that the universal joint with the torque transmission member formed of $\beta$-sialon necessarily has sufficient durability against rolling and sliding contact fatigue. Thus it has not been easy either to ensure that the universal joint including the torque transmission member formed of $\beta$-sialon reliably has sufficient durability.

Accordingly the present invention contemplates a rolling contact member serving as a component of a rolling bearing, that is formed of a sintered $\beta$-sialon (a sintered body containing $\beta$-sialon as a main component) inexpensive and capable of reliably ensuring sufficient durability, and a method of producing the same, and a rolling bearing (including a hub unit) including that rolling contact member. Furthermore, the present invention also contemplates a torque transmission member for a universal joint, that is formed of a sintered $\beta$-sialon (a sintered body containing $\beta$-sialon as a main component) inexpensive and capable of reliably ensuring sufficient durability, and a method of producing the same, and a universal joint that includes that torque transmission member for the universal joint.

Means for Solving the Problems

The present invention in one aspect provides a rolling bearing comprising: a race member; and a plurality of rolling elements disposed in contact with the race member on an annular raceway. The rolling element is configured of a sintered body that contains as a main component a β-sialon represented by a compositional formula of $Si_{6-z}Al_zO_zN_{8-z}$ z and satisfying $0.1 \leq z \leq 3.5$ and has a remainder formed of an impurity.

The present inventor has investigated in detail a relationship between the rolling contact fatigue life of a rolling element containing β-sialon as a main component and the β-sialon's composition, and as a result obtained the following finding and arrived at the present invention.

More specifically, the above β-sialon can be produced to have a variety of compositions having the above value of z (hereinafter referred to as value z) equal to or larger than 0.1 by adopting a production process including combustion synthesis. In general, rolling contact fatigue life is significantly affected by hardness, which hardly varies for value z in a range that facilitates production, i.e., a range equal to or smaller than 4.0. As what relationship is present between the rolling contact fatigue life of a rolling element formed of a sintered body containing β-sialon as a main component and value z has been investigated in detail, however, it has been found that value z exceeding 3.5 significantly decreases the rolling element's rolling contact fatigue life.

More specifically, value z in a range of 0.1 to 3.5 allows rolling contact fatigue life to be substantially equivalent and when a rolling bearing with such value z is operated for a period of time exceeding a predetermined period of time it has a rolling element with a surface flaked and thus damaged. In contrast, value z exceeding 3.5 renders a rolling element wearable, resulting in significantly reduced rolling contact fatigue life. That is, it has been revealed that a composition having value z of 3.5 serves as a boundary at which a rolling element formed of β-sialon has a varying damage mode, and value z exceeding 3.5 significantly decreases rolling contact fatigue life. Accordingly, ensuring that the rolling element formed of β-sialon reliably has sufficient life requires value z equal to or smaller than 3.5.

As has been described previously, β-sialon can be inexpensively be produced through a production process including combustion synthesis. It has been found, however, that value z less than 0.1 makes it difficult to perform combustion synthesis. Accordingly, inexpensively producing a rolling element formed of a sintered body containing β-sialon as a main component requires value z equal to or larger than 0.1.

The present invention in one aspect provides the rolling bearing that includes a rolling element configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity. The present invention in one aspect can thus provide a rolling bearing including a rolling element formed of a sintered β-sialon inexpensive and capable of reliably ensuring sufficient durability.

The present invention in another aspect provides a rolling bearing comprising: a race member; and a plurality of rolling elements disposed in contact with the race member on an annular raceway. The rolling element is configured of a sintered body that contains as a main component a β-sialon represented by a compositional formula of $Si_{6-z}Al_zO_zN_{8-z}$ and satisfying $0.1 \leq z \leq 3.5$ and has a remainder formed of a sintering additive and an impurity.

The present invention in another aspect provides a rolling bearing basically similar in configuration and in function and effect to the rolling bearing provided in one aspect of the present invention as described above. However, the former is different from the latter in that the sintered body contains a sintering additive, as the rolling bearing's application and the like are considered. The rolling bearing in another aspect of the present invention that adopts a sintering additive can facilitate decreasing the sintered body's porosity and thus providing a rolling bearing including a rolling element formed of a sintered β-sialon capable of reliably ensuring sufficient durability.

Note that the sintering additive can include at least one of an oxide, a nitride and an oxynitride of magnesium (Mg), aluminum (Al), silicon (Si), titanium (Ti) and a rare earth element. Furthermore, to achieve a function and effect equivalent to that of the rolling bearing in one aspect of the present invention, it is desirable that the sintering additive be equal to or smaller than 20% by mass of the sintered body.

The present invention in one aspect provides a hub unit posed between a vehicular wheel and a vehicular body and supporting the vehicular wheel relative to the vehicular body rotatably. The present hub unit comprises: an outer member having an inner circumferential surface having an annular raceway surface; an inner member disposed radially inner than the outer member and having an annular raceway surface opposite to the raceway surface of the outer member; and a plurality of rolling elements disposed in contact with the raceway surface of the outer member and the raceway surface of the inner member on an annular raceway. The rolling element is configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity.

As well as the rolling bearing that the present invention provides in one aspect as described above, the present invention in one aspect can provide a hub unit including a rolling element formed of a sintered β-sialon inexpensive and capable of reliably ensuring sufficient durability.

The present invention in another aspect provides a hub unit posed between a vehicular wheel and a vehicular body and supporting the vehicular wheel relative to the vehicular body rotatably. The hub unit comprises: an outer member having an inner circumferential surface having an annular raceway surface; an inner member disposed radially inner than the outer member and having an annular raceway surface opposite to the raceway surface of the outer member; and a plurality of rolling elements disposed in contact with the raceway surface of the outer member and the raceway surface of the inner member on an annular raceway. The rolling element is configured of a sintered body that contains as a main component a β-sialon represented by a compositional formula of $Si_{6-z}Al_zO_zN_{8-z}$ and satisfying $0.1 \leq z \leq 3.5$ and has a remainder formed of a sintering additive and an impurity.

As well as the rolling bearing that the present invention provides in another aspect as described above, the present invention in another aspect can provide a hub unit adopting a sintering additive to facilitate decreasing the sintered body's porosity and thus providing a hub unit including a rolling element formed of a sintered β-sialon capable of reliably ensuring sufficient durability.

The present invention in one aspect provides a rolling contact member in a rolling bearing. The rolling contact member is one of a race member and a rolling element disposed in contact with the race member on an annular raceway. The rolling contact member is configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity. The rolling contact member has a rolling contact surface serving as a surface contacting another rolling contact member, and the rolling contact surface is included in a portion having a high density layer higher in density than an inner portion.

The present invention in another aspect provides a rolling contact member in a rolling bearing. The rolling contact member is one of a race member and a rolling element disposed in contact with the race member on an annular raceway. The rolling contact member is configured of a sintered body that contains as a main component a β-sialon represented by a compositional formula of $Si_{6-z}Al_zO_zN_{8-z}$ and satisfying $0.1 \leq z \leq 3.5$ and has a remainder formed of a sintering additive and an impurity. The rolling contact member has a rolling contact surface serving as a surface contacting another rolling contact member, and the rolling contact surface is included in a portion having a high density layer higher in density than an inner portion.

The present inventor has investigated in detail a relationship between the rolling contact fatigue life of a rolling contact member containing β-sialon as a main component and the rolling contact member's configuration, and as a result obtained the following finding and arrived at the present invention.

More specifically, the present rolling contact member is configured of a sintered body excellent in durability containing as a main component a β-sialon represented by a compositional formula of $Si_{6-z}Al_zO_zN_{8-z}$ and satisfying $0.1 \leq z \leq 3.5$. When a sintered body containing β-sialon as a main component, as described above, is used to produce a rolling contact member, its density significantly affects rolling contact fatigue life, one of the most important durability for the rolling contact member. The present rolling contact member is formed of a sintered body containing β-sialon as a main component and has a raceway/rolling contact surface included in a portion having a high density layer higher in density than an inner portion. As a result the present invention can provide a rolling contact member formed of a sintered body containing as a main component a β-sialon that is inexpensive and capable of reliably ensuring sufficient durability as it achieves improved rolling contact fatigue life.

Herein, a high density layer is a layer in a sintered body that is low in porosity (or high in density), and can be inspected for example as follows: Initially, the rolling contact member is cut along a cross section perpendicular to a surface of the rolling contact member and the cross section is mirror-lapped. The mirror-lapped cross section is then imaged through an optical microscope with oblique illumination (a dark field) at a magnification for example of approximately 50-100 times, and stored in an image equal to or larger than 300 dots per inch (DPI). In doing so, a portion that is white in color is observed as a white color portion, which corresponds to a portion high in porosity (or low in density). Accordingly, a portion having a white color portion having a small area ratio is higher in density than a portion having a white color portion having a large area ratio. An image processor is used to binarize the stored image by a brightness threshold value and a white color portion's area ratio is thus measured and therefrom the imaged portion's density can be obtained. In other words, the present rolling contact member has a raceway/rolling contact surface included in a portion having a high density layer having a white color portion having a smaller area ratio than an inner portion does. Note that preferably the imaging is done randomly at least five locations and the area ratio is evaluated from an average value thereof. Furthermore, the rolling contact member at an inner portion has a white color portion having an area ratio for example equal to or larger than 15%.

Furthermore, to provide the rolling contact member with further increased rolling contact fatigue life, it is preferable that the high density layer has a thickness equal to or larger than 100 μm. Furthermore the sintering additive adopted in the rolling contact member in another aspect as described above can be selected from at least one of an oxide, a nitride and an oxynitride of magnesium (Mg), aluminum (Al), silicon (Si), titanium (Ti) and a rare earth element. Furthermore, to achieve a function and effect equivalent to that of the rolling contact member in one aspect of the present invention, it is desirable that the sintering additive be equal to or smaller than 20% by mass of the sintered body.

In the above rolling contact member preferably when the high density layer is observed in cross section with an optical microscope with oblique illumination, the layer exhibits a portion observed as a portion white in color having an area ratio equal to or smaller than 7%.

The high density layer improved in density to an extent allowing a white color portion to have an area ratio equal to or smaller than 7% provides the rolling contact member with further increased rolling contact fatigue life. The present rolling contact member can thus achieve further increased rolling contact fatigue life.

In the above rolling contact member preferably the high density layer has a surface included in a higher density layer higher in density than another portion of the high density layer.

A higher density layer further higher in density and provided at a portion including a surface of the high density layer can further enhance the rolling contact member's durability against rolling contact fatigue and thus provide the rolling contact member with further increased rolling contact fatigue life.

In the above rolling contact member preferably when the higher density layer is observed in cross section with an optical microscope with oblique illumination, the layer exhibits a portion observed as a portion white in color having an area ratio equal to or smaller than 3.5%.

The higher density layer improved in density to an extent allowing a white color portion to have an area ratio equal to or smaller than 3.5% provides the rolling contact member with further increased rolling contact fatigue life. The present rolling contact member can thus achieve further increased rolling contact fatigue life.

The present invention in still another aspect provides a rolling bearing comprising: a race member; and a plurality of rolling elements disposed in contact with the race member on an annular raceway. At least one of the race member and the rolling element is the rolling contact member of the present invention as described above.

The present rolling bearing that includes the present rolling contact member can be a rolling bearing including a rolling contact member formed of a sintered β-sialon inexpensive and capable of reliably ensuring sufficient durability.

The present invention in one aspect provides a method of producing a rolling contact member in a rolling bearing, the rolling contact member being one of a race member and a rolling element disposed in contact with the race member on an annular raceway, comprising the steps of: preparing a powdery source material that contains as a main component a β-sialon represented by a compositional formula of $Si_{6-z}Al_zO_zN_{8-z}$ and satisfying $0.1 \leq z \leq 3.5$ and has a remainder formed of an impurity; shaping the powdery source material generally into a geometry of the rolling contact member to provide a shaped body; and sintering the shaped body at a pressure equal to or smaller than 1 MPa.

The present invention in another aspect provides a method of producing a rolling contact member in a rolling bearing, the rolling contact member being one of a race member and a rolling element disposed in contact with the race member on an annular raceway, comprising the steps of: preparing a powdery source material that contains as a main component a β-sialon represented by a compositional formula of $Si_{6-z}Al_zO_zN_{8-z}$ and satisfying $0.1 \leq z \leq 3.5$ and has a remainder formed of a sintering additive and an impurity; shaping the powdery source material generally into a geometry of the rolling contact member to provide a shaped body; and sintering the shaped body at a pressure equal to or smaller than 1 MPa.

When a sintered body of ceramics is to be used to produce a rolling contact member, a method is generally employed that adopts hot isostatic press (HIP), gas pressured sintering (GPS), or similar pressure sintering (normally, a method sintering at a pressure equal to or larger than 10 MPa) to reduce or prevent a defect reducing the rolling contact member's rolling contact fatigue life. This conventional production method can reduce the rolling contact member's porosity and thus produce a rolling contact member high in density. The conventional production method adopting pressure sintering, however, invites an increased production cost. Furthermore, the production method adopting pressure sintering alters the rolling contact member at a surface portion in material to cause an anomaly layer. This necessitates removing that anomaly layer in a process for finishing the rolling contact member, which further increases the rolling contact member's production cost. In contrast, if pressure sintering is not adopted, the rolling contact member's porosity is increased and a defect is thus caused and the rolling contact member's rolling contact fatigue life is decreased.

The present inventor has found that sintering a shaped body that contains β-sialon as a main component at a pressure equal to or smaller than 1 MPa to produce a rolling contact member can provide the rolling contact member at a portion that includes a raceway/rolling contact surface (a surface) that is formed at a surface thereof with a high density layer higher in density than an inner portion thereof. The present method of producing a rolling contact member that includes the step of sintering a shaped body that contains β-sialon as a main component at a pressure equal to or smaller than 1 MPa can provide a portion that includes a raceway/rolling contact surface with a high density layer while reducing/eliminating an increased production cost associated with pressure sintering. Consequently the present method of producing a rolling contact member can inexpensively produce a rolling contact member formed of a sintered β-sialon capable of reliably ensuring sufficient durability.

Note that the step of sintering the shaped body is performed preferably at a pressure equal to or larger than 0.01 MPa to reduce or prevent decomposition of β-sialon, and more preferably at a pressure equal to or larger than the atmospheric pressure when cost reduction is considered. Furthermore, to provide the high density layer while reducing production cost, the step of sintering the shaped body is performed preferably at a pressure equal to or smaller than 1 MPa.

In the method of producing a rolling contact member, as described above, preferably, the step of sintering the shaped body includes sintering the shaped body in a range of 1550° C. to 1800° C.

If the shaped body is sintered at a temperature less than 1550° C., it is not sintered to facilitate increasing it in density. Accordingly, the shaped body is sintered preferably at a temperature equal to or higher than 1550° C. and more preferably equal to or higher than 1600° C. In contrast, if the shaped body is sintered at a temperature exceeding 1800° C., the β-sialon may have coarse crystal grains resulting in a sintered body having poor mechanical characteristics. Accordingly, the shaped body is sintered preferably at a temperature equal to or lower than 1800° C. and more preferably equal to or lower than 1750° C.

In the method of producing a rolling contact member, as described above, preferably, the step of sintering the shaped body includes sintering the shaped body in one of an atmosphere of an inert gas and an atmosphere of a gaseous mixture of nitrogen and oxygen.

Sintering the shaped body in an atmosphere of an inert gas can reduce or prevent the β-sialon's decomposition, microstructural variation, and the like. Furthermore, sintering the shaped body in an atmosphere of a gaseous mixture of nitrogen and oxygen allows a resultant sintered β-sialon to contain nitrogen and oxygen in a controlled amount.

The method of producing a rolling contact member, as described above, preferably, further includes the step of forming a surface of the shaped body before sintering the shaped body.

The shaped body that has been sintered is significantly increased in hardness and thus hard to work. Accordingly, for example sintering the shaped body and thereafter extensively working the shaped body to finish it as a rolling contact member invites an increased cost for producing the rolling contact member. In contrast, sintering the shaped body after working it to allow a finishing step or the like to be done such that the sintered shaped body is worked in a reduced amount allows a rolling contact member to be produced at a reduced cost. In particular, a production method adopting pressure sintering entails removing an anomaly layer, which entails working a sintered body in a relatively large amount. Thus, such a step does not have a large advantage. The present method of producing a rolling contact member adopts the step of sintering a shaped body that is formed of β-sialon at a pressure equal to or smaller than 1 MPa. This can reduce/eliminate an amount of working to remove an anomaly layer and the step is thus significantly beneficial.

The method of producing a rolling contact member, as described above, preferably further includes the step of working a surface of the sintered shaped body to remove a portion including the surface, and the step of working removes the shaped body by a thickness equal to or smaller than 150 μm.

The present method of producing a rolling contact member provides a portion including a surface with a higher density layer aforementioned, and having a thickness of approximately 150 μm. Accordingly, when a sintered shaped body is to have a surface worked to remove a portion including that surface, e.g., when the sintered shaped body undergoes a finishing step, the finishing step that is done to remove the shaped body by a thickness equal to or smaller than 150 μm allows the rolling contact member to have a raceway/rolling contact surface with a higher density layer remaining therein. The step as described above allows a rolling contact member to be produced with further improved rolling contact fatigue life. Note that to ensure that the higher density layer remains, the step more preferably removes the sintered shaped body by a thickness equal to or smaller than 100 μm.

The present invention in one aspect provides a universal joint comprising: a race member connected to a first shaft member; a torque transmission member arranged in contact with the race member rollably on a surface of the race member; and a second shaft member connected via the torque transmission member and the race member to the first shaft member. The universal joint transmits rotation transmitted to one of the first shaft member and the second shaft member about an axis to the other of the first shaft member and the second shaft member. The torque transmission member is configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity.

The present inventor has investigated in detail a relationship between the durability of a torque transmission member that contains β-sialon as a main component against rolling and sliding contact fatigue and the β-sialon's composition, and as a result obtained the following finding and arrived at the present invention.

More specifically, the above β-sialon can be produced to have a variety of compositions having the above value of z (hereinafter referred to as value z) equal to or larger than 0.1 by adopting a production process including combustion synthesis. In general, durability against rolling and sliding contact fatigue is significantly affected by hardness, which hardly varies for value z in a range that facilitates production, i.e., a range equal to or smaller than 4.0. As what relationship is present between the durability of a torque transmission member formed of a sintered body containing β-sialon as a main component against rolling and sliding contact fatigue and value z has been investigated in detail, however, it has been found that value z exceeding 3.5 significantly decreases the torque transmission member's durability against rolling and sliding contact fatigue.

More specifically, value z in a range of 0.1 to 3.5 allows durability against rolling and sliding contact fatigue to be substantially equivalent and when a universal joint is operated for a period of time exceeding a predetermined period of time the torque transmission member has a surface flaked and thus damaged. In contrast, value z exceeding 3.5 renders the torque transmission member wearable, resulting in significantly reduced durability against rolling and sliding contact fatigue. That is, it has been revealed that a composition having value z of 3.5 serves as a boundary at which the torque transmission member formed of β-sialon has a varying damage mode, and value z exceeding 3.5 significantly decreases durability against rolling and sliding contact fatigue. Accordingly, ensuring that the torque transmission member formed of β-sialon reliably has sufficient durability against rolling and sliding contact fatigue requires value z equal to or smaller than 3.5.

As has been described previously, β-sialon can inexpensively be produced through a production process including combustion synthesis. It has been found, however, that value z less than 0.1 makes it difficult to perform combustion synthesis. Accordingly, inexpensively producing a torque transmission member formed of a sintered body containing β-sialon as a main component requires value z equal to or larger than 0.1.

The present invention in one aspect provides the universal joint that includes a torque transmission member configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity. The present invention in one aspect can thus provide a universal joint including a torque transmission member formed of a sintered β-sialon inexpensive and capable of reliably ensuring sufficient durability.

The present invention in another aspect provides a universal joint comprising: a race member connected to a first shaft member; a torque transmission member arranged in contact with the race member rollably on a surface of the race member; and a second shaft member connected via the torque transmission member and the race member to the first shaft member. The universal joint transmits rotation transmitted to one of the first shaft member and the second shaft member about an axis to the other of the first shaft member and the second shaft member. The torque transmission member is configured of a sintered body that contains as a main component a β-sialon represented by a compositional formula of $Si_{6-z}Al_zO_zN_{8-z}$ and satisfying $0.1 \leq z \leq 3.5$ and has a remainder formed of a sintering additive and an impurity.

The present invention in another aspect provides a universal joint basically similar in configuration and in function and effect to the universal joint provided in one aspect of the present invention as described above. However, the former is different from the latter in that the former contains a sintering additive, as the universal joint's application and the like are considered. The universal joint in another aspect of the present invention that adopts a sintering additive can facilitate decreasing the sintered body's porosity and thus providing a universal joint including a torque transmission member formed of a sintered β-sialon capable of reliably ensuring sufficient durability.

Note that the sintering additive can include at least one of an oxide, a nitride and an oxynitride of magnesium (Mg), aluminum (Al), silicon (Si), titanium (Ti) and a rare earth element. Furthermore, to achieve a function and effect equivalent to that of the universal joint in one aspect of the present invention, it is desirable that the sintering additive be equal to or smaller than 20% by mass of the sintered body.

The present invention in one aspect provides a torque transmission member for a universal joint, provided in a universal joint between a race member connected to a first shaft member and a second shaft member rollably and slidably and transmitting rotation transmitted to one of the first shaft member and the second shaft member about an axis to the other of the first shaft member and the second shaft member. The torque transmission member is configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity. The torque transmission member has a contact surface serving as a surface contacting another member, and the surface is included in a portion having a high density layer higher in density than an inner portion.

The present invention in another aspect provides a torque transmission member for a universal joint, provided in a universal joint between a race member connected to a first shaft member and a second shaft member rollably and slidably and transmitting rotation transmitted to one of the first shaft member and the second shaft member about an axis to the other of the first shaft member and the second shaft member. The torque transmission member is configured of a sintered body that contains as a main component a β-sialon represented by a compositional formula of $Si_{6-z}Al_zO_zN_{8-z}$ and satisfying $0.1 \leq z \leq 3.5$ and has a remainder formed of a sintering additive and an impurity. The torque transmission member has a contact surface serving as a surface contacting another member and the surface is included in a portion having a high density layer higher in density than an inner portion.

The present inventor has investigated in detail a relationship between the durability of a torque transmission member that is provided for a universal joint and contains β-sialon as a main component against rolling and sliding contact fatigue and the torque transmission member's configuration, and as a result obtained the following finding and arrived at the present invention.

More specifically, the present torque transmission member for a universal joint is configured of a sintered body excellent in durability, containing as a main component a β-sialon represented by a compositional formula of $Si_{6-z}Al_zO_zN_{8-z}$ and satisfying $0.1 \leq z \leq 3.5$. When a sintered body containing β-sialon as a main component, as described above, is used to produce a torque transmission member for a universal joint, its density significantly affects durability against rolling and sliding contact fatigue, one of the most important durability for the torque transmission member for the universal joint. The present torque transmission member for a universal joint is formed of a sintered body containing β-sialon as a main component and has a contact surface included in a portion having a high density layer higher in density than an inner portion. As a result the present invention can provide a torque transmission member for a universal joint, that is formed of a sintered body containing as a main component a β-sialon inexpensive and capable of reliably ensuring sufficient durability as it achieves improved durability against rolling and sliding contact fatigue.

Herein, a high density layer is a layer in a sintered body that is low in porosity (or high in density), and can be inspected for example as follows: Initially, the torque transmission member for a universal joint is cut along a cross section perpendicular to a surface of the torque transmission member for the universal joint and the cross section is mirror-lapped. The mirror-lapped cross section is then imaged through an optical microscope with oblique illumination (a dark field) at a magnification for example of approximately 50-100 times, and stored in an image equal to or larger than 300 dots per inch (DPI). In doing so, a portion that is white in color is observed as a white color portion, which corresponds to a portion high in porosity (or low in density). Accordingly, a portion having a white color portion having a small area ratio is higher in density than a portion having a white color portion having a large area ratio. An image processor is used to binarize the stored image by a brightness threshold value and a white color portion's area ratio is thus measured and therefrom the imaged portion's density can be obtained. In other words, the present torque transmission member for a universal joint has a contact surface included in a portion having a high density layer having a white color portion having a smaller area ratio than an inner portion does. Note that preferably the imaging is done randomly at least five locations and the area ratio is evaluated from an average value thereof. Furthermore, the torque transmission member for the universal joint has at an inner portion a white color portion having an area ratio for example equal to or larger than 15%.

Furthermore, to provide the torque transmission member for a universal joint with further increased durability against rolling and sliding contact fatigue, it is preferable that the high density layer has a thickness equal to or larger than 100 μm. Furthermore the sintering additive adopted in the torque transmission member for a universal joint in another aspect as described above can be selected from at least one of an oxide, a nitride and an oxynitride of magnesium (Mg), aluminum (Al), silicon (Si), titanium (Ti) and a rare earth element. Furthermore, to achieve a function and effect equivalent to that of the torque transmission member for a universal joint in one aspect of the present invention, it is desirable that the sintering additive be equal to or smaller than 20% by mass of the sintered body.

In the above torque transmission member for a universal joint preferably when the high density layer is observed in cross section with an optical microscope with oblique illumination, the layer exhibits a portion observed as a portion white in color having an area ratio equal to or smaller than 7%.

The high density layer improved in density to an extent allowing a white color portion to have an area ratio equal to or smaller than 7% provides the torque transmission member for a universal joint with further increased durability against rolling and sliding contact fatigue. The present torque transmission member for a universal joint can thus achieve further increased durability against rolling and sliding contact fatigue.

In the above torque transmission member for a universal joint preferably the high density layer has a surface included in a higher density layer higher in density than another portion of the high density layer.

A higher density layer further higher in density and provided at a portion including a surface of the high density layer can further enhance the torque transmission member for a universal joint in durability against rolling and sliding contact fatigue.

In the above torque transmission member for a universal joint preferably when the higher density layer is observed in cross section with an optical microscope with oblique illumination, the layer exhibits a portion observed as a portion white in color having an area ratio equal to or smaller than 3.5%.

The higher density layer improved in density to an extent allowing a white color portion to have an area ratio equal to or smaller than 3.5% provides the torque transmission member for a universal joint with further increased durability against rolling and sliding contact fatigue.

The present invention in still another aspect provides a universal joint comprising: a race member connected to a first shaft member; a torque transmission member arranged in contact with the race member rollably and slidably on a surface of the race member; and a second shaft member connected via the torque transmission member and the race member to the first shaft member. The universal joint transmits rotation transmitted to one of the first shaft member and the second shaft member about an axis to the other of the first shaft member and the second shaft member. The torque transmission member is the torque transmission member that is provided for a universal joint in accordance with the present invention as described above.

The present universal joint that includes the present torque transmission member for a universal joint, as described above, can provide a universal joint including a torque transmission member formed of a sintered β-sialon inexpensive and capable of reliably ensuring sufficient durability.

The present invention in one aspect provides a method of producing a torque transmission member for a universal joint, provided in a universal joint between a race member connected to a first shaft member and a second shaft member rollably and slidably and transmitting rotation transmitted to one of the first shaft member and the second shaft member about an axis to the other of the first shaft member and the second shaft member, comprising the steps of: preparing a powdery source material that contains as a main component a β-sialon represented by a compositional formula of $Si_{6-z}Al_zO_zN_{8-z}$ and satisfying $0.1 \leq z \leq 3.5$ and has a remainder formed of an impurity; shaping the powdery source material generally into a geometry of the torque transmission member for the universal joint to provide a shaped body; and sintering the shaped body at a pressure equal to or smaller than 1 MPa.

The present invention in another aspect provides a method of producing a torque transmission member for a universal joint, provided in a universal joint between a race member connected to a first shaft member and a second shaft member rollably and slidably and transmitting rotation transmitted to one of the first shaft member and the second shaft member about an axis to the other of the first shaft member and the second shaft member, comprising the steps of: preparing a powdery source material that contains as a main component a β-sialon represented by a compositional formula of $Si_{6-z}Al_zO_zN_{8-z}$ and satisfying $0.1 \leq z \leq 3.5$ and has a remainder formed of a sintering additive and an impurity; shaping the powdery source material generally into a geometry of the torque transmission member for the universal joint to provide a shaped body; and sintering the shaped body at a pressure equal to or smaller than 1 MPa.

When a sintered body of ceramics is to be used to produce a torque transmission member for a universal joint, a method is generally employed that adopts hot isostatic press (HIP), gas pressured sintering (GPS), or similar pressure sintering (normally, a method sintering at a pressure equal to or larger than 10 MPa) to reduce or prevent a defect reducing the torque transmission member's durability against rolling and sliding contact fatigue. This conventional production method can reduce the torque transmission member's porosity and thus produce a torque transmission member high in density for a universal joint. The conventional production method adopting pressure sintering, however, invites an increased production cost. Furthermore, the production method adopting pressure sintering alters the torque transmission member at a surface portion in material to cause an anomaly layer. This necessitates removing that anomaly layer in a process for finishing the torque transmission member, which further increases the cost for producing the torque transmission member. In contrast, if pressure sintering is not adopted, the torque transmission member's porosity is increased and a defect is thus caused, and the torque transmission member is impaired in durability against rolling and sliding contact fatigue.

The present inventor has found that sintering a shaped body that contains β-sialon as a main component at a pressure equal to or smaller than 1 MPa to produce a torque transmission member for a universal joint can provide the torque transmission member at a portion that includes a contact surface (a surface) that is formed at a surface thereof with a high density layer higher in density than an inner portion thereof. The present method of producing a torque transmission member for a universal joint that includes the step of sintering a shaped body that contains β-sialon as a main component at a pressure equal to or smaller than 1 MPa can provide a portion that includes a contact surface with a high density layer while reducing/eliminating an increased production cost associated with pressure sintering. Consequently the present method of producing a torque transmission member for a universal joint can inexpensively produce a torque transmission member formed of a sintered β-sialon capable of reliably ensuring sufficient durability for a universal joint.

Note that the step of sintering the shaped body is performed preferably at a pressure equal to or larger than 0.01 MPa to reduce or prevent decomposition of β-sialon, and more preferably at a pressure equal to or larger than the atmospheric pressure when cost reduction is considered. Furthermore, to provide the high density layer while reducing production cost, the step of sintering the shaped body is performed preferably at a pressure equal to or smaller than 1 MPa.

In the method of producing a torque transmission member for a universal joint, as described above, preferably, the step of sintering the shaped body includes sintering the shaped body in a range of 1550° C. to 1800° C.

If the shaped body is sintered at a temperature less than 1550° C., it is not sintered to facilitate increasing it in density. Accordingly, the shaped body is sintered preferably at a temperature equal to or higher than 1550° C. and more preferably equal to or higher than 1600° C. In contrast, if the shaped body is sintered at a temperature exceeding 1800° C., the β-sialon may have coarse crystal grains resulting in a sintered body having poor mechanical characteristics. Accordingly, the shaped body is sintered preferably at a temperature equal to or lower than 1800° C. and more preferably equal to or lower than 1750° C.

In the method of producing a torque transmission member for a universal joint, as described above, preferably, the step of sintering the shaped body includes sintering the shaped body in one of an atmosphere of an inert gas and an atmosphere of a gaseous mixture of nitrogen and oxygen.

Sintering the shaped body in an atmosphere of an inert gas can reduce or prevent the β-sialon's decomposition, microstructural variation, and the like. Furthermore, sintering the shaped body in an atmosphere of a gaseous mixture of nitrogen and oxygen allows a resultant sintered β-sialon to contain nitrogen and oxygen in a controlled amount.

The method of producing a torque transmission member for a universal joint, as described above, preferably, further includes the step of forming a surface of the shaped body before sintering the shaped body.

The shaped body that has been sintered is significantly increased in hardness and thus hard to work. Accordingly, for example sintering the shaped body and thereafter extensively working the shaped body to finish it as a torque transmission member for a universal joint invites an increased cost for producing the torque transmission member for the universal joint. In contrast, sintering the shaped body after working it to allow a finishing step or the like to be done such that the sintered shaped body is worked in a reduced amount allows a torque transmission member for a universal joint to be produced at a reduced cost. In particular, a production method adopting pressure sintering entails removing an anomaly layer, which entails working a sintered body in a relatively large amount. Thus, such a step does not have a large advantage. The present method of producing a torque transmission member for a universal joint adopts the step of sintering a shaped body formed of β-sialon at a pressure equal to or smaller than 1 MPa. This can reduce/eliminate an amount of working to remove an anomaly layer and the step is thus significantly beneficial.

The method of producing a torque transmission member for a universal joint, as described above, preferably further includes the step of working a surface of the sintered shaped body to remove a portion including the surface, and the step of working removes the shaped body by a thickness equal to or smaller than 150 μm.

The present method of producing a torque transmission member for a universal joint provides a portion including a surface with a higher density layer aforementioned, and having a thickness of approximately 150 μm. Accordingly, when a sintered shaped body is to have a surface worked to remove a portion including that surface, e.g., when the sintered shaped body undergoes a finishing step, the finishing step that is done to remove the shaped body by a thickness equal to or smaller than 150 μm allows the torque transmission member for the universal joint to have a contact surface with a higher density layer remaining therein. The step as described above allows a torque transmission member for a universal joint to be produced with further improved durability against rolling and sliding contact fatigue. Note that to ensure that the higher density layer remains, the step more preferably removes the sintered shaped body by a thickness equal to or smaller than 100 μm.

Effects of the Invention

As is apparent from the above description, the present rolling bearing, hub unit, rolling contact member, and method of producing the same can provide a rolling contact member formed of a sintered β-sialon inexpensive and capable of reliably ensuring sufficient durability, and a method of producing the same, and a rolling bearing (including a hub unit) including that rolling contact member. Furthermore, the present universal joint, torque transmission member for a universal joint, and method of producing the same can provide a torque transmission member for a universal joint that is formed of a sintered β-sialon inexpensive and capable of reliably ensuring sufficient durability, and a method of producing the same, and a universal joint that includes that torque transmission member for the universal joint.

DESCRIPTION OF THE REFERENCE SIGNS

1: deep-grooved ball bearing, 2: thrust needle roller bearing, 3: hub unit, 11: outer ring, 11A: outer ring raceway surface, 11B: outer ring high density layer, 11C, 12C, 13C: inner portion, 11D: outer ring higher density layer, 12: inner ring, 12A: inner ring raceway surface, 12B: inner ring high density layer, 12D: inner ring higher density layer, 13: ball, 13A: ball rolling contact surface, 13B: ball high density layer, 13D: ball higher density layer, 14, 24, 39A, 39B: cage, 21: bearing washer, 21A: bearing washer raceway surface, 21B: bearing washer high density layer, 21C, 23C: inner portion, 21D: bearing washer higher density layer, 23: needle roller, 23A: roller rolling contact surface, 23B: roller high density layer, 23D: higher density layer, 31: outer ring, 31A1, 31A2, 32A, 33A: raceway surface, 31B: outer ring high density layer, 31C, 32C, 33C, 34C: inner portion, 31D: outer ring higher density layer, 32: hub ring, 32B: hub ring high density layer, 32D: hub ring higher density layer, 33: inner ring, 33B: inner ring high density layer, 33D: inner ring higher density layer, 34: ball, 34A: ball rolling contact surface, 34B: ball high density layer, 34D: ball higher density layer, 35: hub ring flange, 35A: hub ring through hole, 36: bolt, 37: outer ring flange, 37A: outer ring through hole, 38: fixing ring, 100: fixed joint, 111: inner race, 111A: inner race ball groove, 112: outer race, 112A: outer race ball groove, 113: ball, 113A: ball rolling contact surface, 113B: ball high density layer, 113C: inner portion, 113D: ball higher density layer, 114: cage, 115, 116: shaft, 200: tripod joint, 221: tripod, 211: tripod shaft, 222: outer race, 222A: outer race groove, 223: spherical roller, 223A: spherical roller rolling contact surface, 223B: spherical roller high density layer, 223C: inner portion, 223D: spherical roller higher density layer, 225, 226: shaft, 229: needle roller.

BEST MODES FOR CARRYING OUT THE INVENTION

Hereinafter reference will be made to the drawings to describe the present invention in embodiments. In the figures, identical or corresponding components are identically denoted and will not be described repeatedly.

First Embodiment

Figure 1:
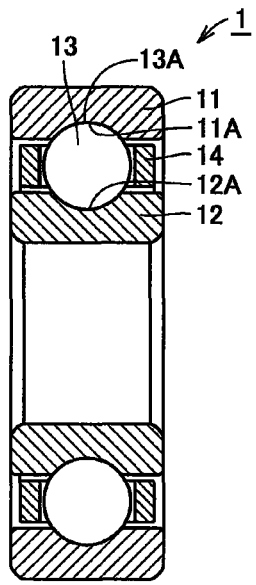
FIG. 1 is a schematic cross section of a configuration of a deep-grooved ball bearing in a first embodiment.

A deep-grooved ball bearing serving as a rolling bearing in a first embodiment of the present invention will now be described hereinafter. With reference to FIG. 1, a deep-grooved ball bearing 1 includes a race member implemented as an annular outer ring 11, a race member implemented as an annular inner ring 12 arranged to be inner than outer ring 11, and rolling elements implemented as a plurality of balls 13 arranged between outer and inner rings 11 and 12 and held in an annular cage 14. Outer ring 11 has an inner circumferential surface having an outer ring raceway surface 11A and inner ring 12 has an outer circumferential surface having an inner ring raceway surface 12A. Outer ring 11 and inner ring 12 are disposed such that inner ring raceway surface 12A and outer ring raceway surface 11A face each other. The plurality of balls 13 are held in a rollable manner on an annular raceway, with their rolling contact surfaces 13A in contact with inner ring raceway surface 12A and outer ring raceway surface 11A, disposed at a predetermined pitch in the circumferential direction by means of cage 14. By such a configuration, outer ring 11 and inner ring 12 of deep-grooved ball bearing 1 can be rotated relative to each other.

Herein in the present embodiment the rolling element implemented as ball 13 is configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity. The present embodiment thus provides deep-grooved ball bearing 1 that is a rolling bearing including a rolling element (ball 13) formed of a sintered β-sialon inexpensive and capable of reliably ensuring sufficient durability. The impurity includes an unavoidably introduced impurity including those derived from a source material or entering during the production process.

Note that in the present embodiment the rolling element implemented as ball 13 may be configured of a sintered body that contains as a main component a β-sialon represented by a compositional formula of $Si_{6-z}Al_zO_zN_{8-z}$ and satisfying $0.1 \leq z \leq 3.5$ and has a remainder formed of a sintering additive and an unavoidably introduced impurity. The sintering additive helps to reduce the sintered body in porosity and hence provide a rolling bearing including a rolling element formed of a sintered β-sialon capable of reliably ensuring sufficient durability. The impurity includes an unavoidably introduced impurity including those derived from a source material or entering during the production process.

Hereinafter reference will be made to FIG. 2 to describe a thrust needle roller bearing serving as a rolling bearing in an exemplary variation of the first embodiment.

Figure 2:
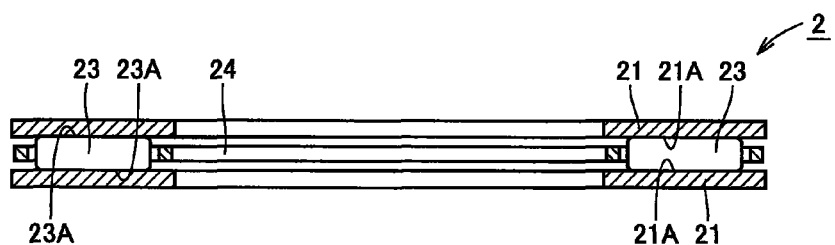
FIG. 2 is a schematic cross section of a configuration of a thrust needle roller bearing in an exemplary variation of the first embodiment.

With reference to FIG. 2, a thrust needle roller bearing 2 is basically similar in configuration to deep-grooved ball bearing 1 described with reference to FIG. 1, except that the former includes a race member and a rolling element different in configuration than the latter. More specifically, thrust needle roller bearing 2 includes a pair of bearing washers 21 in the form of a disk, serving as a race member arranged such that their respective, one main surfaces face each other, a plurality of needle rollers 23 serving as a rolling element, and an annular cage 24. The plurality of needle rollers 23 are held in a rollable manner on an annular raceway, with their respective outer circumferential surfaces or rolling contact surfaces 23A in contact with bearing washer raceway surface 21A formed at the main surfaces of the pair of bearing washers 21 facing each other, disposed at a predetermined pitch in the circumferential direction by means of cage 24. By such a configuration, the pair of bearing washers 21 of thrust needle roller bearing 2 can be rotated relative to each other.

Herein in the present exemplary variation the rolling element implemented as needle roller 23 corresponds to ball 13 as described above and is similar thereto in composition. Thus the present exemplary variation provides thrust needle roller bearing 2 that is a rolling bearing including a rolling element (needle roller 23) formed of a sintered β-sialon inexpensive and capable of reliably ensuring sufficient durability.

Hereinafter will be described a method of producing a rolling bearing in the first embodiment serving as one embodiment of the present invention.

Figure 3:
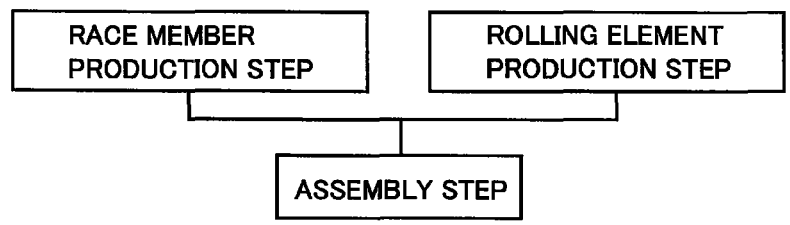
FIG. 3 generally represents a method of producing a rolling bearing in the first embodiment.

With reference to FIG. 3, in the first embodiment, a rolling bearing is produced in a method, as follows: Initially, a race member is produced in a race member production step and a rolling element is produced in a rolling element production step. More specifically the race member production step is performed to produce outer ring 11, inner ring 12, bearing washer 21 and the like. The rolling element production step is performed to produce ball 13, needle roller 23 and the like.

Then an assembly step is performed to combine the race member produced in the race member production step and the rolling element produced in the rolling element production step together to assemble a rolling bearing. More specifically, for example, outer ring 11 and inner ring 12, and ball 13 are combined together to assemble deep-grooved ball bearing 1. The rolling element production step is performed for example in accordance with a method of producing a rolling element, as will be described hereinafter.

Figure 4:
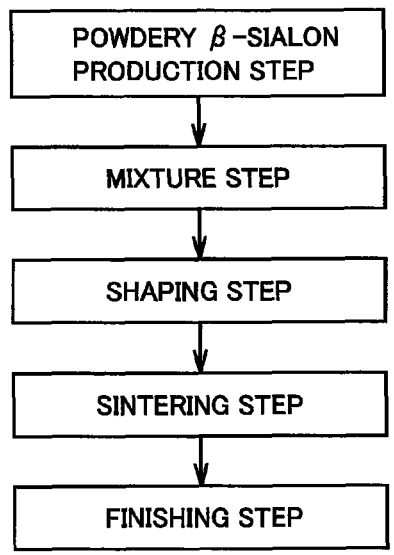
FIG. 4 generally represents a method of producing a rolling element, as included in the method of producing the rolling bearing in the first embodiment.

With reference to FIG. 4, in the first embodiment, a rolling element is produced in a method as follows: Initially, a powdery β-sialon production step is performed to produce powdery β-sialon represented by a compositional formula of $Si_{6-z}Al_zO_zN_{8-z}$ and satisfying $0.1 \leq z \leq 3.5$. The powdery β-sialon production step can be performed for example with combustion synthesis adopted to produce powdery β-sialon inexpensively.

A mixture step is then performed to add a sintering additive to the powdery β-sialon produced in the powdery β-sialon production step and mix them together. The mixture step can be eliminated if the sintering additive is not added.

Then, with reference to FIG. 4, a shaping step is performed to shape the powdery β-sialon or the mixture of the powdery β-sialon and the sintering additive generally into the geometry of the rolling element. More specifically, the powdery β-sialon or the mixture of the powdery β-sialon and the sintering additive is press-formed, cast-molded, extrusion-formed, rolling-granulated, or similarly shaped to provide a body shaped generally into a geometry of ball 13, needle roller 23 or the like.

A sintering step is then performed to heat and sinter the shaped body to produce a sintered body generally having the geometry of ball 13, needle roller 23 or the like. The sintering step may be performed at the normal atmospheric pressure, i.e., in the form of pressureless sintering. Alternatively, it may be done with hot press (HP), hot isostatic press (HP) or a similar sintering technique adopted. Furthermore when the shaped body is sintered, it can be heated with: a heater; a microwave, a millimeter wave or a similar electromagnetic wave; or the like.

Subsequently, with reference to FIG. 4, a finishing step is performed to work the sintered body that has been produced in the sintering step to be finished to complete a rolling element. More specifically, the sintered body produced in the sintering step has a surface polished to complete a rolling element implemented as ball 13, needle roller 23 or the like. Through the above steps a rolling element in the present embodiment is completed. This rolling element is combined with outer ring 11 and inner ring 12/bearing washer 21 that are separately prepared to assemble deep-grooved ball bearing 1 or thrust needle roller bearing 2.

Second Embodiment

Figure 5:
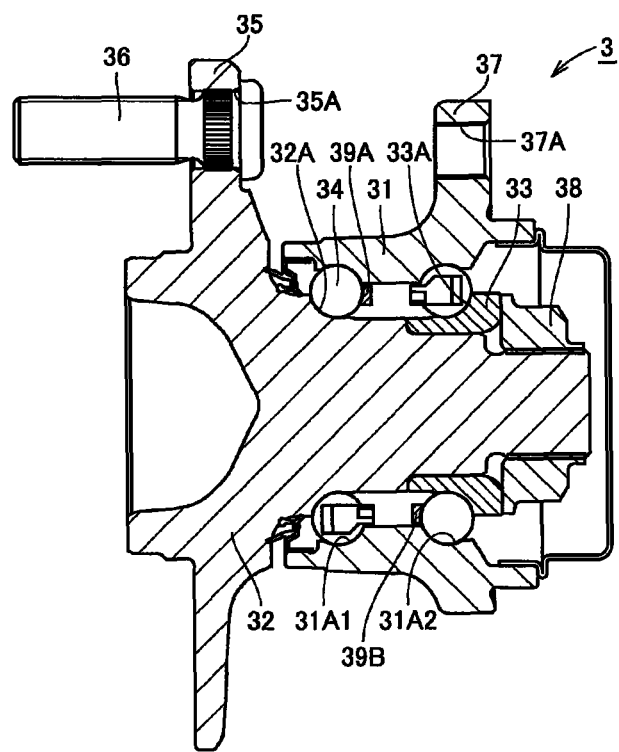
FIG. 5 is a schematic cross section of a configuration of a hub unit in a second embodiment.

A second embodiment provides a hub unit, as will be described hereinafter. With reference to FIG. 5, a hub unit 3 is basically similar in configuration and effect to deep-grooved ball bearing 1 described with reference to FIG. 1, except that the former includes a race member and a rolling element different in configuration than the latter. More specifically, hub unit 3 is a device posed between a vehicular wheel and a vehicular body and rotatably supporting the wheel relative to the body. Hub unit 3 includes a race member implemented as an outer ring 31, a hub ring 32 and an inner ring 33, and a rolling element implemented as a plurality of balls 34.

Outer ring 31, serving as an outer member, is an annular race member having an inner circumferential surface provided with two rows of raceway surfaces 31A1, 31A2. Hub ring 32, serving as an inner member, is a race member having a raceway surface 32A opposite to one raceway surface 31A1 of outer ring 31 and disposed to have a portion surrounded by outer ring 31. Furthermore, inner ring 33, serving as an inner member, is an annular race member that has a raceway surface 33A opposite to the other raceway surface 31A2 of outer ring 31, and is fitted in contact with a portion of an outer circumferential surface of hub ring 32, and fixed to hub ring 32 by a fixing ring 38 fitted in contact with a portion of an outer circumferential surface of hub ring 32.

The plurality of balls 34 are rotatably arranged on an annular raceway of a plurality of (two) rows. One row is in contact with one raceway surface 31A1 of outer ring 31 and raceway surface 32A of hub ring 32 and arranged by an annular cage 39A in a circumferential direction at a predetermined pitch. The other row is in contact with the other raceway surface 31A2 of outer ring 31 and raceway surface 33A of inner ring 33 and arranged by an annular cage 39B in a circumferential direction at a predetermined pitch. The outer member implemented as outer ring 31 and the inner member implemented as hub ring 32 and inner ring 33 can thus rotate relative to each other.

Furthermore, hub ring 32 has a hub ring flange 35 having a hub ring through hole 35A. Hub ring through hole 35A receives a bolt 36 to fix hub ring flange 35 and a vehicular wheel (not shown) to each other. Outer ring 31 has an outer ring flange 37 having an outer ring through hole 37A. Outer ring through hole 37A receives a bolt (not shown) to fix outer ring flange 37 and a suspension device (not shown) that is fixed to the vehicular body to each other. Thus hub unit 3 is posed between the vehicular wheel and the vehicular body to support the wheel relative to the body rotatably.

In other words, the present embodiment provides hub unit 3 that is a hub unit posed between a vehicular wheel and a vehicular body to support the wheel relative to the body rotatably. Hub unit 3 includes: an outer member implemented as outer ring 31 having an inner circumferential surface provided with annular raceway surface 31A1, 31A2; an inner member implemented as hub ring 32 provided with annular raceway surface 32A opposite to raceway surface 31A1 of outer ring 31 and disposed with at least a portion thereof surrounded by an inner circumferential surface of outer ring 31; and an inner member implemented as inner ring 33 provided with annular raceway surface 33A opposite to raceway surface 31A2 of outer ring 31 and disposed with at least a portion thereof surrounded by an inner circumferential surface of outer ring 31. Furthermore, hub unit 3 includes a plurality of balls 34 arranged on an annular raceway and in contact at a ball rolling contact surface 34A with outer ring 31 at raceway surfaces 31A1, 31A2 and hub ring 32 and inner ring 33 at raceway surfaces 32A, 33A.

Herein, with reference to FIG. 5, the present embodiment provides a rolling element implemented as ball 34, which corresponds in the first embodiment to ball 13 and is similarly configured. The present embodiment thus provides hub unit 3 that serves as a rolling bearing including a rolling element (ball 34) formed of a sintered β-sialon inexpensive and capable of reliably ensuring sufficient durability. Note that the rolling bearing implemented in the second embodiment as hub unit 3 and the rolling element implemented in the second embodiment as ball 34 that hub unit 3 includes can be produced similarly as they are produced in the first embodiment.

Third Embodiment

The present invention in a third embodiment provides a rolling bearing and a rolling contact member, as will be described hereinafter. With reference to FIG. 1, the third embodiment provides a rolling bearing and a rolling contact member basically similar in configuration and effect to those provided in the first embodiment. However, the former has an additional feature, as follows:

With reference to FIG. 1, the third embodiment provides deep-grooved ball bearing 1 similar in configuration to the first embodiment, and thus having its outer ring 11 and inner ring 12 rotatable relative to each other.

Figure 6:
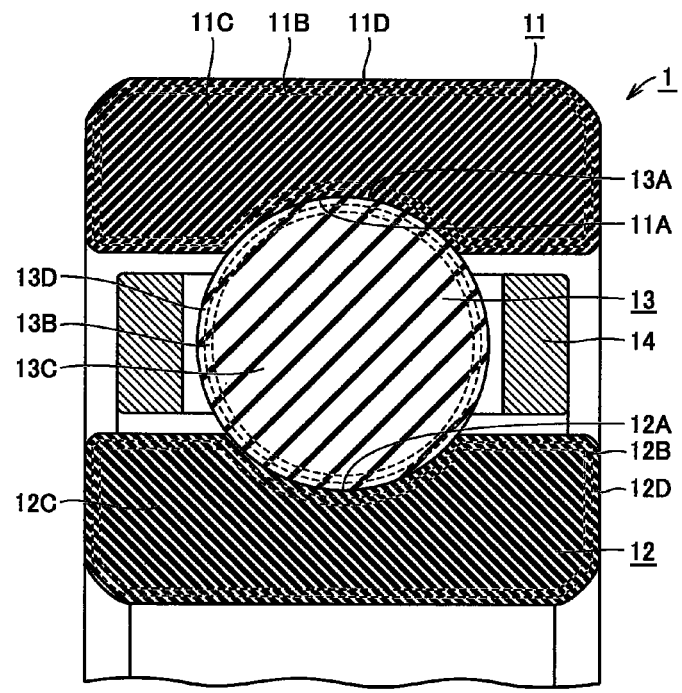
FIG. 6 is an enlarged schematic partial cross section of a main portion of FIG. 1.
Figure 7:
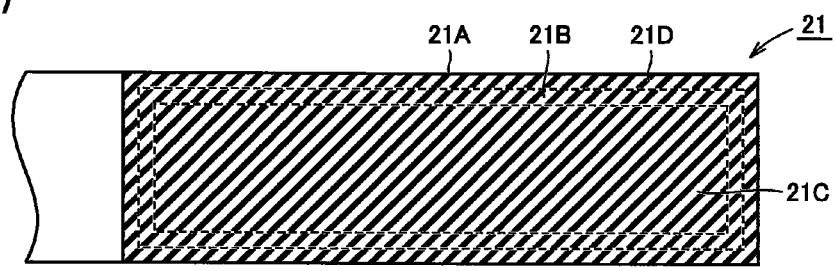
FIG. 7 is an enlarged schematic partial cross section of a main portion of a bearing washer that the FIG. 2 thrust needle roller bearing includes.
Figure 8:
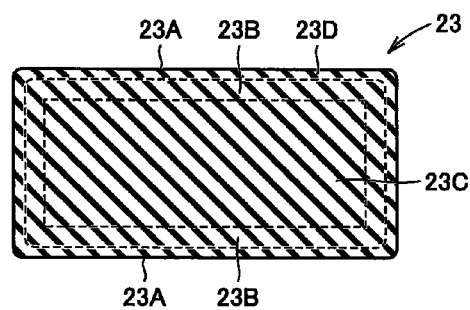
FIG. 8 is an enlarged schematic partial cross section of a main portion of a needle roller that the FIG. 2 thrust needle roller bearing includes.

Herein, with reference to FIG. 6, the present embodiment provides a rolling contact member implemented as outer ring 11, inner ring 12 and ball 13 configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity. Furthermore, outer ring 11, inner ring 12 and ball 13 have outer ring raceway surface 11A, inner ring raceway surface 12A and ball rolling contact surface 13A, respectively, included in a portion provided with an outer ring high density layer 11B, an inner ring high density layer 12B and a ball high density layer 13B higher in density than inner portions 11C, 12C, 13C. When outer ring high density layer 11B, inner ring high density layer 12B and ball high density layer 13B are observed in cross section with an optical microscope with oblique illumination, they exhibit a portion white in color, hereinafter also referred to as a white color portion, having an area ratio equal to or smaller than 7%. The present embodiment thus provides deep-grooved ball bearing 1 that serves as a rolling bearing including a rolling contact member (outer ring 11, inner ring 12 and ball 13) formed of a sintered β-sialon inexpensive and capable of reliably ensuring sufficient durability. The impurity includes an unavoidably introduced impurity including those derived from a source material or entering during the production process.

Note that in the present embodiment the rolling contact member implemented as outer ring 11, inner ring 12 and ball 13 may be configured of a sintered body that contains β-sialon as a main component and has a remainder formed of a sintering additive and an impurity. The sintering additive helps to reduce the sintered body in porosity and hence provide a rolling bearing including a rolling contact member formed of a sintered β-sialon capable of reliably ensuring sufficient durability. The impurity includes an unavoidably introduced impurity including those derived from a source material or entering during the production process.

Furthermore, with reference to FIG. 6, outer ring high density layer 11B, inner ring high density layer 12B and ball high density layer 13B have surfaces, or outer ring raceway surface 11A, inner ring raceway surface 12A and ball rolling contact surface 13A, respectively, included in a portion provided with an outer ring higher density layer 11D, an inner ring higher density layer 12D and a ball higher density layer 13D further higher in density than another portion of outer ring high density layer 11B, inner ring high density layer 12B and ball high density layer 13B. When outer ring higher density layer 11D, inner ring higher density layer 12D and ball higher density layer 13D are observed in cross section with an optical microscope with oblique illumination, they exhibit a white color portion having an area ratio equal to or smaller than 3.5%. Outer ring 11, inner ring 12 and ball 13 are thus further improved in durability against rolling contact fatigue and thus achieve further improved rolling contact fatigue life.

The third embodiment in an exemplary variation provides a rolling bearing and a rolling contact member, as will be described hereinafter. With reference to FIG. 2, the third embodiment in the exemplary variation provides a rolling bearing and a rolling contact member basically similar in configuration and effect to those in the exemplary variation of the first embodiment. However, the former has an additional feature, as follows:

With reference to FIG. 2, the third embodiment in the exemplary variation provides thrust needle roller bearing 2 similar in configuration to the exemplary variation of the first embodiment, and thus having a pair of bearing washers 21 rotatable relative to each other.

Herein, the present exemplary variation provides a rolling contact member implemented as bearing washer 21 and needle roller 23, which correspond respectively to outer ring 11 or inner ring 12 and ball 13 as described above and similarly have inner portions 21C, 23C, a high density layer (a bearing washer high density layer 21B, a roller high density layer 23B) and a higher density layer (a bearing washer higher density layer 21D, a roller higher density layer 23D). Thus the present exemplary variation provides thrust needle roller bearing 2 that is a rolling bearing including a rolling contact member (bearing washer 21, needle roller 23) formed of a sintered β-sialon inexpensive and capable of reliably ensuring sufficient durability.

Hereinafter will be described a method of producing a rolling bearing and a rolling contact member in the third embodiment serving as one embodiment of the present invention. The third embodiment provides a method of producing a rolling bearing and a rolling contact member that can be performed similarly as that in the first embodiment is performed. However, the former method is different from the latter method in the method of producing the rolling contact member.

Figure 9:
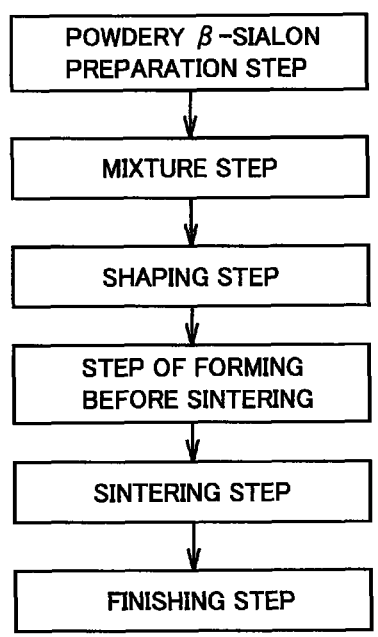
FIG. 9 generally represents a method of producing a rolling contact member, as included in a method of producing a rolling bearing in a third embodiment.

With reference to FIG. 9, in the present embodiment, a rolling contact member is produced in a method, as follows: Initially, powdery β-sialon is prepared in a powdery β-sialon preparation step. The powdery β-sialon preparation step can be performed for example with combustion synthesis adopted in a production step to produce powdery β-sialon inexpensively.

A mixture step is then performed to add a sintering additive to the powdery β-sialon prepared in the powdery β-sialon preparation step and mix them together. The mixture step can be eliminated if the sintering additive is not added.

Then, with reference to FIG. 9, a shaping step is performed to shape the powdery β-sialon or the mixture of the powdery β-sialon and the sintering additive generally into the geometry of the rolling contact member. More specifically, the powdery β-sialon or the mixture of the powdery β-sialon and the sintering additive is press-formed, cast-molded, extrusion-formed, rolling-granulated, or similarly shaped to provide a body shaped generally into the geometry of the rolling contact member implemented as outer ring 11, inner ring 12, ball 13, bearing washer 21, needle roller 23 and the like.

The step of forming before sintering is then performed to form a surface of the shaped body to allow the shaped body that has been sintered to have a geometry closer to that of a rolling contact member as desired. More specifically, green body forming or a similar forming technique is used to shape the shaped body so that the shaped body having been sintered can have a geometry closer to that of outer ring 11, inner ring 12, ball 13, bearing washer 21, needle roller 23 or the like. The step of forming before sintering can be eliminated if the shaping step provides a shaped body in a condition allowing the shaped body that has been sintered to have a geometry close to that of a rolling contact member as desired.

Then, with reference to FIG. 9, a sintering step is performed to sinter the shaped body at a pressure equal to or smaller than 1 MPa. More specifically, the shaped body is heated with a heater, a microwave, a millimeter wave or a similar electromagnetic wave and thus sintered to provide a sintered body generally having a geometry of outer ring 11, inner ring 12, ball 13, bearing washer 21, needle roller 23 or the like. The shaped body is sintered by being heated in an atmosphere of an inert gas or that of a gaseous mixture of nitrogen and oxygen to a range of 1550° C. to 1800° C. The inert gas can be helium, neon, argon, nitrogen or the like. In view of production cost reduction, nitrogen is preferably adopted.

Then the sintered body produced in the sintering step has a surface worked to remove a portion including that surface, i.e., it is worked for finish, to complete a rolling contact member, i.e., a finishing step is performed. More specifically, the sintered body produced in the sintering step has a surface polished to complete a rolling contact member implemented as outer ring 11, inner ring 12, ball 13, bearing washer 21, needle roller 23 and the like. Through the above steps the rolling contact member in the present embodiment completes.

Herein, the sintering step provides a sintered body having at a portion from its surface to a depth of approximately 500 μm a high density layer higher in density than an inner portion and having a portion white in color, or a white color portion, as observed in cross section with an optical microscope with oblique illumination, having an area ratio equal to or smaller than 7%. Furthermore, the sintered body has at a portion from its surface to a depth of approximately 150 μm a higher density layer further higher in density than another portion of the high density layer and having a portion white in color, or a white color portion, as observed in cross section with an optical microscope with oblique illumination, having an area ratio equal to or smaller than 3.5%. Accordingly in the finishing step the sintered body is removed preferably by a thickness equal to or smaller than 150 μm in a portion that should serve as a raceway/rolling contact surface in particular. This allows the higher density layer to remain in a portion including outer ring raceway surface 11A, inner ring raceway surface 12A, ball rolling contact surface 13A, bearing washer raceway surface 21A and roller rolling contact surface 23A to provide the rolling contact member with improved rolling contact fatigue life.

Fourth Embodiment

The present invention in a fourth embodiment provides a rolling bearing and a rolling contact member, as will be described hereinafter. With reference to FIG. 5, the fourth embodiment provides a rolling bearing implemented as a hub unit and its rolling contact member basically similar in configuration and effect to those provided in the second embodiment. However, the former has an additional feature, as follows:

With reference to FIG. 5, the fourth embodiment provides hub unit 3 similar in configuration to the second embodiment, and thus capable of being posed between a vehicular wheel and a vehicular body and rotatably supporting the wheel relative to the body.

Figure 10:
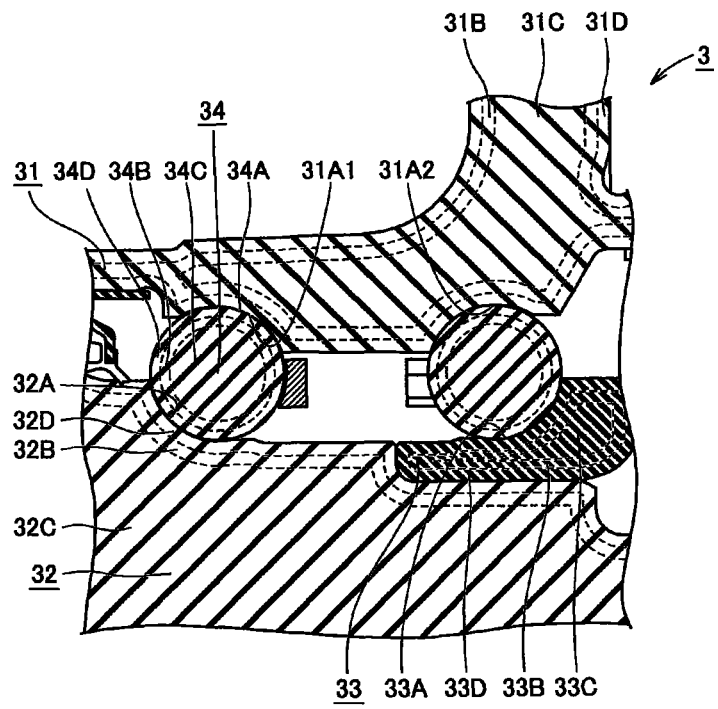
FIG. 10 is an enlarged schematic partial cross section of a main portion of FIG. 5 in a fourth embodiment.

Herein, with reference to FIG. 5 and FIG. 10, the present embodiment provides a rolling contact member implemented as outer ring 31, hub ring 32 and inner ring 33, and ball 34, which correspond respectively to outer ring 11 and inner ring 12, and ball 13 of the third embodiment and similarly have inner portions 31C, 32C, 33C, 34C, a high density layer (an outer ring high density layer 31B, a hub ring high density layer 32B, an inner ring high density layer 33B, a ball high density layer 34B) and a higher density layer (an outer ring higher density layer 31D, a hub ring higher density layer 32D, an inner ring higher density layer 33D, a ball higher density layer 34D). Thus the present embodiment provides hub unit 3 that is a rolling bearing including a rolling contact member (outer ring 31, hub ring 32, inner ring 33, ball 34) formed of a sintered β-sialon inexpensive and capable of reliably ensuring sufficient durability. Note that the rolling bearing implemented in the fourth embodiment as hub unit 3 and the rolling contact member implemented in the fourth embodiment as outer ring 31, hub ring 32, inner ring 33, ball 34 that hub unit 3 includes in the fourth embodiment can be produced similarly as they are produced in the third embodiment.

In the above embodiments the present rolling bearing and rolling contact member are exemplified by a deep-grooved ball bearing, a thrust needle roller bearing and a hub unit, and a rolling contact member that they include. The present rolling bearing and rolling contact member, however, are not limited thereto. For example, the race member may be a shaft, a plate, or the like allowing a rolling element to roll on a surface thereof. In other words, the present rolling contact member corresponding to the race member may be any member that has a raceway surface for rolling a rolling element. Furthermore, the present rolling bearing may be a thrust ball bearing or may be a radial roller bearing.

Furthermore, if in the present rolling bearing one of a race member and a rolling element is the present rolling contact member, it is preferable that the rolling element be the present rolling contact member, considering the cost for producing the rolling bearing.

The present rolling bearing may have its race member formed of a material which is not particularly limited. It may for example be steel, more specifically, Japanese Industrial Standard (JIS) SUJ2 or a similar bearing steel, SCR420, SCM420 or a similar carburizing steel. Furthermore, the present rolling bearing may have its race member formed of a material of ceramics such as silicon nitride.

Fifth Embodiment

Figure 11:
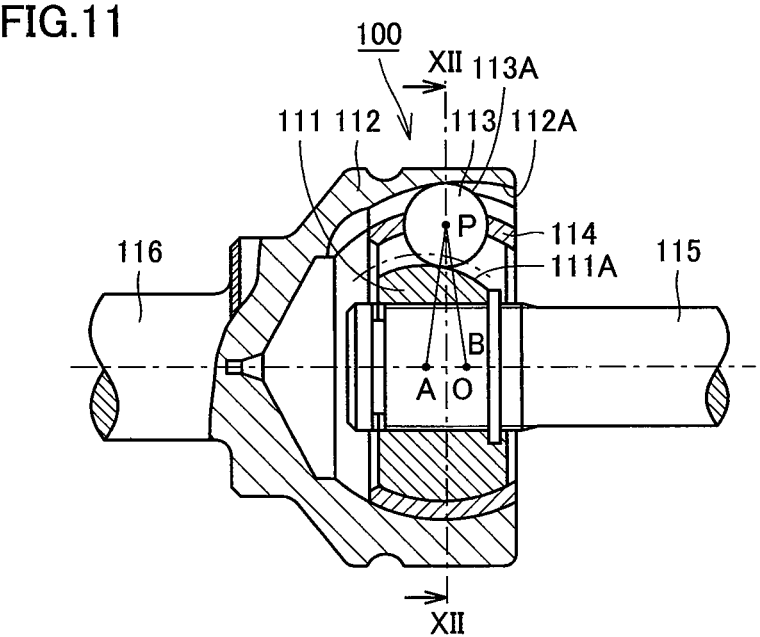
FIG. 11 is a schematic cross section of a configuration of a constant velocity joint (a fixed joint) in a fifth embodiment.
Figure 12:
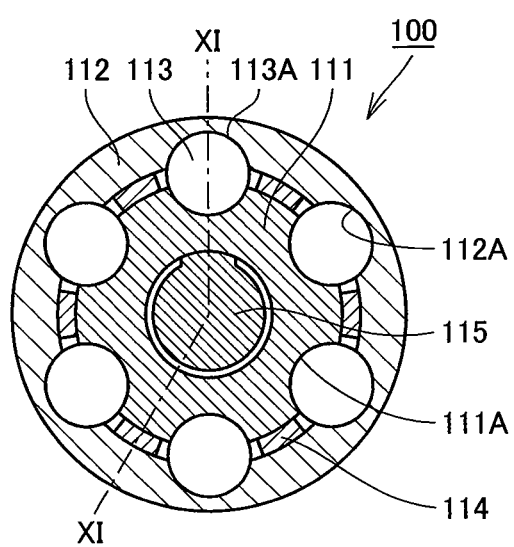
FIG. 12 is a schematic cross section taken along a line XII-XII shown in FIG. 11.
Figure 13:
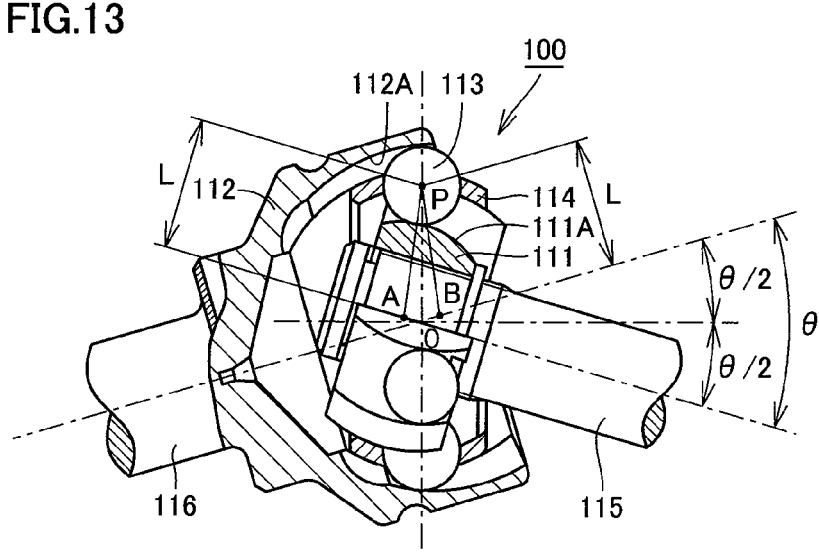
FIG. 13 is a schematic cross section of the FIG. 11 fixed joint forming an angle.

With reference to FIG. 11 to FIG. 13, the present invention in a fifth embodiment provides a universal joint implemented as a fixed joint. Note that FIG. 11 corresponds to a schematic cross section taken along a line XI-XI shown in FIG. 12.

With reference to FIG. 11, the fifth embodiment provides a fixed joint 100 including a race member implemented as an inner race 111 coupled to a second shaft implemented as a shaft 115, a race member implemented as an outer race 112 arranged to surround the outer circumferential side of inner race 111 and coupled to a first shaft implemented as a shaft 116, a torque transmission member implemented as a ball 113 arranged between inner race 111 and outer race 112, and a cage 114 holding ball 113. Ball 113 is arranged with a surface, or a ball rolling contact surface 113A, in contact with an inner race ball groove 111A formed at the outer circumferential surface of inner race 111 and an outer race ball groove 112A formed at the inner circumferential surface of outer race 112, and is held by cage 114 to avoid falling off.

As shown in FIG. 11, inner race ball groove 111A and outer race ball groove 112A located at the outer circumferential surface of inner race 111 and the inner circumferential surface of outer race 112, respectively, are formed in a curve (arc) with points A and B equally spaced apart at the left and right on the axis passing through the center of shafts 115 and 116 in a straight line from the joint center O on the axis as the center of curvature. In other words, inner race ball groove 111A and outer race ball groove 112A are formed such that the trajectory of center P of ball 113 that rolls in contact with inner race ball groove 111A and outer race ball groove 112A corresponds to a curve (arc) with point A (inner race center A) and point B (outer race center B) as the center of curvature. Accordingly, ball 113 is constantly located on the bisector of an angle (∠AOB) with respect to the axis passing through the center of shafts 115 and 116 even when the fixed joint forms an angle (when the fixed joint operates such that the axes passing through the center of shafts 115 and 116 cross).

Fixed joint 100 operates, as will be described hereinafter. With reference to FIGS. 11 and 12, when the rotation about the axis is transmitted to one of shafts 115 and 116 at fixed joint 100, this rotation is transmitted to the other of shafts 115 and 116 via ball 113 fitted in inner race ball groove 111A and outer race ball groove 112A.

In the case where shafts 115 and 116 form an angle θ as shown in FIG. 13, ball 113 is guided by inner race ball groove 111A and outer race ball groove 112A with inner race center A and outer race center B as the center of curvature to be held at a position where its center P is located on the bisector of ∠AOB. Since inner race ball groove 111A and outer race ball groove 112A are formed such that the distance from joint center O to inner race center A is equal to the distance from joint center O to outer race center B, the distance from center P of ball 113 to respective inner race center A and outer race center B is equal. Thus, triangle OAP is congruent to triangle OBP. As a result, the distances L from center P of ball 113 to shafts 115 and 116 are equal to each other, and when one of shafts 115 and 116 rotates about the axis, the other also rotates at constant velocity. Thus, fixed joint 100 can ensure constant velocity even in the state where shafts 115 and 116 constitute an angle. Cage 114 serves, together with inner race ball groove 111A and outer race ball groove 112A, to prevent ball 113 from jumping out of inner race ball groove 111A and outer race ball groove 112A when shafts 115 and 116 rotate, and also to determine joint center O of fixed joint 100.

In other words the fifth embodiment provides fixed joint 100 serving as a universal joint, including a race member implemented as outer race 112 connected to a first shaft member implemented as shaft 116, a torque transmission member implemented as ball 113 arranged in contact with outer race 112 and rollably on a surface of outer race ball groove 112A formed in outer race 112, and a second shaft member implemented as shaft 115 connected to shaft 116 via ball 113 and outer race 112. Furthermore, fixed joint 100 is a universal joint transmitting the rotation transmitted to one of shaft 116 and shaft 115 about an axis to the other of shaft 116 and shaft 115.

The torque transmission member implemented as ball 113 is configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity. Thus the present embodiment provides fixed joint 100 that is a universal joint including a torque transmission member (ball 113) formed of a sintered β-sialon inexpensive and capable of reliably ensuring sufficient durability. The impurity includes an unavoidably introduced impurity including those derived from a source material or entering during the production process.

Note that in the present embodiment the torque transmission member implemented as ball 113 may be configured of a sintered body that contains as a main component a β-sialon represented by a compositional formula of $Si_{6-z}Al_zO_zN_{8-z}$ and satisfying $0.1 \leq z \leq 3.5$ and has a remainder formed of a sintering additive and an unavoidably introduced impurity. The sintering additive helps to reduce the sintered body in porosity and hence provide a universal joint including a torque transmission member formed of a sintered β-sialon capable of reliably ensuring sufficient durability. The impurity includes an unavoidably introduced impurity including those derived from a source material or entering during the production process.

Figure 14:
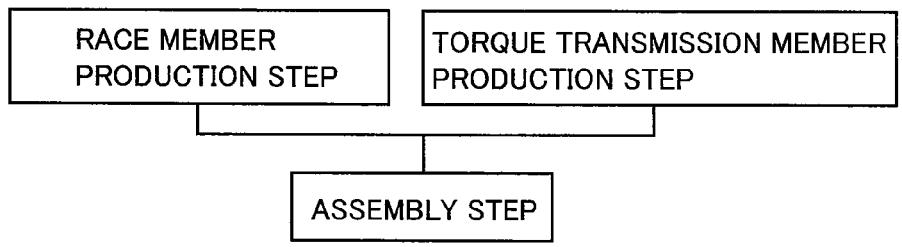
FIG. 14 generally represents a method of producing a universal joint in the fifth embodiment.

Hereinafter will be described a method of producing a universal joint in the fifth embodiment serving as one embodiment of the present invention. With reference to FIG. 14, in the fifth embodiment, a universal joint is produced in a method, as follows: Initially, a race member is produced in a race member production step and a torque transmission member is produced in a torque transmission member production step. More specifically the race member production step is performed to produce inner race 111, outer race 112 and the like. The torque transmission member production step is performed to produce ball 113 and the like.

Then an assembly step is performed to combine the race member produced in the race member production step and the torque transmission member produced in the torque transmission member production step together to assemble a universal joint. More specifically, for example, inner race 111 and outer race 112, ball 113, and cage 114 separately prepared and other components are combined together to assemble fixed joint 100. The torque transmission member production step is performed for example in accordance with a method of producing a torque transmission member for a universal joint, as will be described hereinafter.

Figure 15:
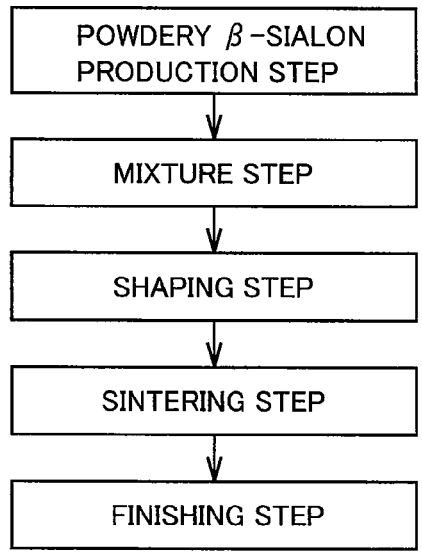
FIG. 15 generally represents a method of producing a torque transmission member, as included in the method of producing the universal joint in the fifth embodiment.

With reference to FIG. 15, in the fifth embodiment, a torque transmission member for a universal joint is produced in a method as follows: Initially, a powdery β-sialon production step is performed to produce powdery β-sialon represented by a compositional formula of $Si_{6-z}Al_zO_zN_{8-z}$ and satisfying $0.1 \leq z \leq 3.5$. The powdery β-sialon production step can be performed for example with combustion synthesis adopted to produce powdery β-sialon inexpensively.

A mixture step is then performed to add a sintering additive to the powdery β-sialon produced in the powdery β-sialon production step and mix them together. The mixture step can be eliminated if the sintering additive is not added.

Then, with reference to FIG. 15, a shaping step is performed to shape the powdery β-sialon or the mixture of the powdery β-sialon and the sintering additive generally into the geometry of the torque transmission member. More specifically, the powdery β-sialon or the mixture of the powdery β-sialon and the sintering additive is press-formed, cast-molded, extrusion-formed, rolling-granulated, or similarly shaped to provide a body shaped generally into a geometry of ball 113 or the like.

A sintering step is then performed to heat and sinter the shaped body to produce a sintered body generally having the geometry of ball 113 or the like. The sintering step may be performed at the normal atmospheric pressure, i.e., in the form of pressureless sintering. Alternatively, it may be done with hot press (HP), hot isostatic press (HIP) or a similar sintering technique adopted. Furthermore when the shaped body is sintered, it can be heated with: a heater; a microwave, a millimeter wave or a similar electromagnetic wave; or the like.

Subsequently, with reference to FIG. 15, a finishing step is performed to work the sintered body that has been produced in the sintering step to be finished to complete a torque transmission member. More specifically, the sintered body produced in the sintering step has a surface polished to complete a torque transmission member implemented as ball 113 or the like. Through the above steps a torque transmission member in the present embodiment is completed. This torque transmission member is combined with inner race 111 and outer race 112 that are separately prepared to assemble fixed joint 100.

Sixth Embodiment

Figure 16:
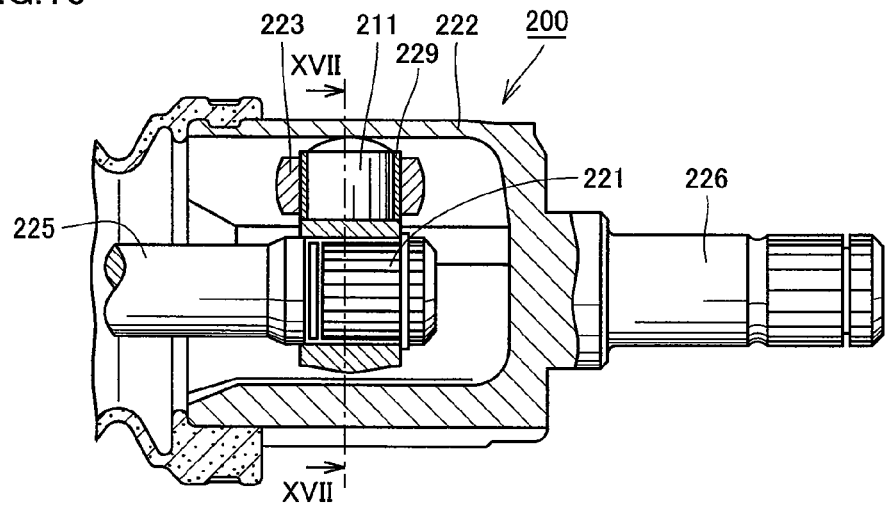
FIG. 16 is a schematic cross section of a configuration of a constant velocity joint (a tripod joint) serving as a universal joint in a sixth embodiment.
Figure 17:
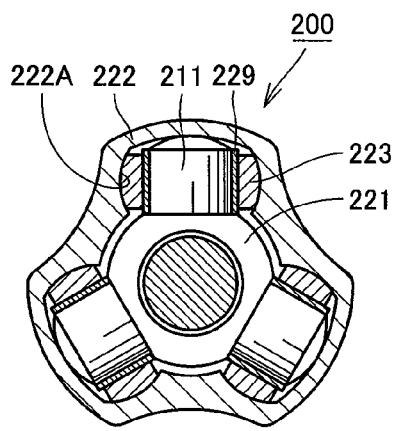
FIG. 17 is a schematic cross section taken along a line XVII-XVII shown in FIG. 16.

The present invention in a sixth embodiment provides a universal joint implemented as tripod joint configured as will be described hereinafter. With reference to FIG. 16 and FIG. 17, the sixth embodiment provides a tripod joint 200 basically similar in configuration and effect to fixed joint 100 of the fifth embodiment. However, the former is different from the latter in how the race member and the torque transmission member are configured. More specifically, tripod joint 200 includes a tripod 221 that has a tripod shaft 211 extending in a single plane in three directions and is connected to a second shaft member implemented as a shaft 225, a race member implemented as an outer race 222 arranged to surround tripod 221 and connected to a first shaft member implemented as a shaft 226, and a torque transmission member implemented as an annular spherical roller 223 attached to tripod shaft 211 via a needle roller 229 rollably and having an outer circumferential surface having a spherical roller rolling contact surface 223A in contact with a surface of an outer race groove 222A formed in an inner circumferential surface of outer race 222.

Thus in tripod joint 200 when one of shafts 225, 226 receives rotation about an axis the rotation can be transmitted via tripod 221, outer race 222 and spherical roller 223 to the other of shafts 225, 226 at a constant velocity and shafts 225, 226 can also move relative to each other in an axial direction passing through the center of shafts 225, 226.

In other words the sixth embodiment provides tripod joint 200 serving as a universal joint, including a race member implemented as outer race 222 connected to a first shaft member implemented as shaft 226, a torque transmission member implemented as spherical roller 223 arranged in contact with outer race 222 and rollably on a surface of outer race groove 222A formed in outer race 222, and a second shaft member implemented as shaft 225 connected to shaft 226 via spherical roller 223 and outer race 222. Furthermore, tripod joint 200 is a universal joint transmitting the rotation transmitted to one of shaft 226 and shaft 225 about an axis to the other of shaft 226 and shaft 225.

The torque transmission member implemented as spherical roller 223 corresponds in the fifth embodiment to ball 113 and is similarly configured. Thus the present embodiment provides tripod joint 200 that is a universal joint including a torque transmission member (spherical roller 223) formed of a sintered β-sialon inexpensive and capable of reliably ensuring sufficient durability. Note that the universal joint implemented in the sixth embodiment as tripod joint 200 and the torque transmission member implemented in the sixth embodiment as spherical roller 223 that tripod joint 200 includes can be produced similarly as they are produced in the fifth embodiment.

Seventh Embodiment

The present invention in a seventh embodiment provides a universal joint and a torque transmission member for the universal joint. With reference to FIG. 11 to FIG. 13, the seventh embodiment provides a universal joint and a torque transmission member for the universal joint that are basically similar in configuration and effect to those in the fifth embodiment. However, the former has an additional feature, as follows:

With reference to FIG. 11 to FIG. 13, the seventh embodiment provides fixed joint 100 having a configuration similar to the fifth embodiment. Thus when rotation about an axis is transmitted to one of shafts 115 and 116, this rotation is transmitted to the other of shafts 115 and 116 via ball 113 placed in inner race ball groove 111A and outer race ball groove 112A, and even if shafts 115, 116 form an angle, constant velocity can be ensured.

Figure 18:
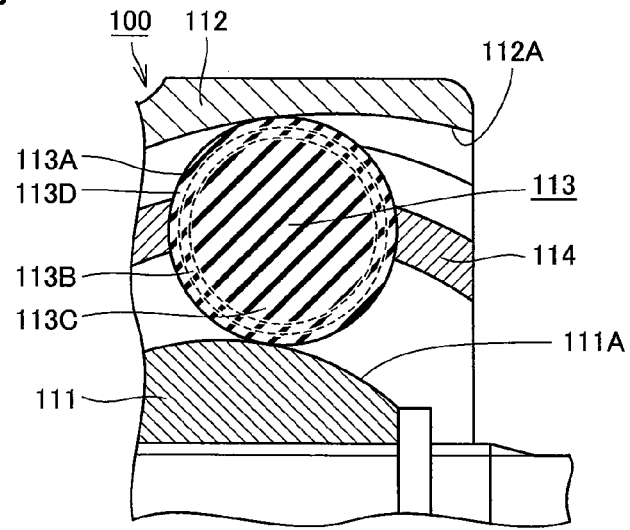
FIG. 18 is an enlarged schematic partial cross section of a main portion of FIG. 11.
Figure 19:
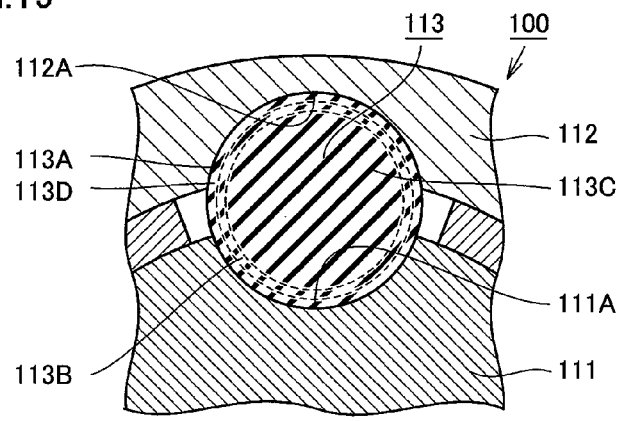
FIG. 19 is an enlarged schematic partial cross section of a main portion of FIG. 12.

Herein, with reference to FIG. 18 and FIG. 19, the present embodiment provides a torque transmission member for a universal joint, implemented as ball 113, which is configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity. Furthermore, ball 113 has a rolling contact surface, indicated as a ball rolling contact surface 113A, included in a portion provided with a ball high density layer 113B higher in density than an inner portion 113C. When ball high density layer 113B is observed in cross section with an optical microscope with oblique illumination, it exhibits a portion white in color, hereinafter also referred to as a white color portion, having an area ratio equal to or smaller than 7%. The present embodiment thus provides fixed joint 100 that serves as a universal joint including a torque transmission member (ball 113) formed of a sintered β-sialon inexpensive and capable of reliably ensuring sufficient durability. The impurity includes an unavoidably introduced impurity including those derived from a source material or entering during the production process.

Note that in the present embodiment the torque transmission member implemented as ball 113 may be configured of a sintered body that contains β-sialon as a main component and has a remainder formed of a sintering additive and an impurity. The sintering additive helps to reduce the sintered body in porosity and hence provide a universal joint including a torque transmission member formed of a sintered β-sialon capable of reliably ensuring sufficient durability. The impurity includes an unavoidably introduced impurity including those derived from a source material or entering during the production process.

Furthermore, with reference to FIG. 18 and FIG. 19, ball high density layer 113B has a surface, or ball rolling contact surface 113A, included in a portion provided with a ball higher density layer 113D further higher in density than another portion of ball high density layer 113B. When ball higher density layer 113D is observed in cross section with an optical microscope with oblique illumination, it exhibits a white color portion having an area ratio equal to or smaller than 3.5%. Ball 113 is thus further improved in durability against rolling and sliding contact fatigue.

Hereinafter will be described a method of producing a universal joint and a torque transmission member for the universal joint in the seventh embodiment serving as one embodiment of the present invention. The seventh embodiment provides a method of producing a universal joint and a torque transmission member for the universal joint that can be performed similarly as that in the fifth embodiment is performed. However, the former method is different from the latter method in the method of producing the torque transmission member for the universal joint.

Figure 20:
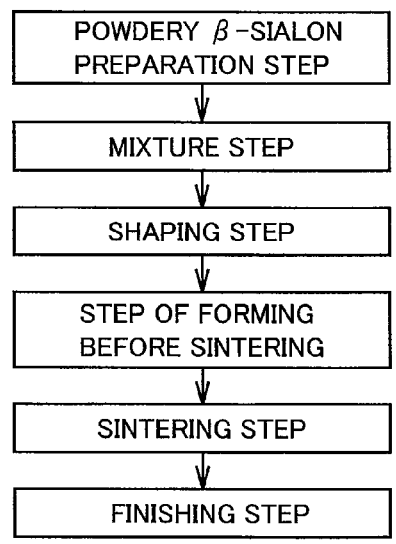
FIG. 20 generally represents a method of producing a torque transmission member for a universal joint, as included in a method of producing a universal joint in a seventh embodiment.

With reference to FIG. 20, in the present embodiment, a torque transmission member for a universal joint is produced in a method, as follows: Initially, powdery β-sialon is prepared in a powdery β-sialon preparation step. The powdery β-sialon preparation step can be performed for example with combustion synthesis adopted in a production step to produce powdery β-sialon inexpensively.

A mixture step is then performed to add a sintering additive to the powdery β-sialon prepared in the powdery β-sialon preparation step and mix them together. The mixture step can be eliminated if the sintering additive is not added.

Then, with reference to FIG. 20, a shaping step is performed to shape the powdery β-sialon or the mixture of the powdery β-sialon and the sintering additive generally into the geometry of the torque transmission member for the universal joint. More specifically, the powdery β-sialon or the mixture of the powdery β-sialon and the sintering additive is press-formed, cast-molded, extrusion-formed, rolling-granulated, or similarly shaped to provide a body shaped generally into the geometry of the torque transmission member implemented as ball 113 or the like for the universal joint.

The step of forming before sintering is then performed to form a surface of the shaped body to allow the shaped body that has been sintered to have a geometry closer to that of a torque transmission member as desired for a universal joint. More specifically, green body forming or a similar forming technique is used to shape the shaped body so that the shaped body having been sintered can have a geometry closer to that of ball 113 or the like. The step of forming before sintering can be eliminated if the shaping step provides a shaped body in a condition allowing the shaped body that has been sintered to have a geometry close to that of a torque transmission member as desired for a universal joint.

Then, with reference to FIG. 20, a sintering step is performed to sinter the shaped body at a pressure equal to or smaller than 1 MPa. More specifically, the shaped body is heated with a heater, a microwave, a millimeter wave or a similar electromagnetic wave and thus sintered to provide a sintered body generally having a geometry of ball 113 or the like. The shaped body is sintered by being heated in an atmosphere of an inert gas or that of a gaseous mixture of nitrogen and oxygen to a range of 1550° C. to 1800° C. The inert gas can be helium, neon, argon, nitrogen or the like. In view of production cost reduction, nitrogen is preferably adopted.

Then the sintered body produced in the sintering step has a surface worked to remove a portion including that surface, i.e., it is worked for finish, to complete a torque transmission member for a universal joint, i.e., a finishing step is performed. More specifically, the sintered body produced in the sintering step has a surface polished to complete a torque transmission member implemented as ball 113 or the like for a universal joint. Through the above steps the torque transmission member for the universal joint in the present embodiment completes.

Herein, the sintering step provides a sintered body having at a portion from its surface to a depth of approximately 500 µm a high density layer higher in density than an inner portion and having a portion white in color, or a white color portion, as observed in cross section with an optical microscope with oblique illumination, having an area ratio equal to or smaller than 7%. Furthermore, the sintered body has at a portion from its surface to a depth of approximately 150 µm a higher density layer further higher in density than another portion of the high density layer and having a portion white in color, or a white color portion, as observed in cross section with an optical microscope with oblique illumination, having an area ratio equal to or smaller than 3.5%. Accordingly in the finishing step the sintered body is removed preferably by a thickness equal to or smaller than 150 μm in a portion that should serve as a contact surface in particular. This allows the higher density layer to remain in a portion including ball rolling contact surface 113A to provide the torque transmission member for the universal joint with improved durability against rolling and sliding contact fatigue.

Eighth Embodiment

The present invention in an eighth embodiment provides a universal joint and a torque transmission member for the universal joint, as will be described hereinafter. With reference to FIG. 16 and FIG. 17, the eighth embodiment provides a universal joint and a torque transmission member for the universal joint basically similar in configuration and effect to those provided in the sixth embodiment. However, the former has an additional feature, as follows:

With reference to FIG. 16 and FIG. 17, the eighth embodiment provides tripod joint 200 having a configuration similar to the sixth embodiment. Thus when one of shafts 225, 226 receives rotation about the axis the rotation is transmitted via tripod 221, outer race 222 and spherical roller 223 to the other of shafts 225, 226 at a constant velocity and shafts 225, 226 can also move relative to each other in an axial direction passing through the center of shafts 225, 226.

Figure 21:
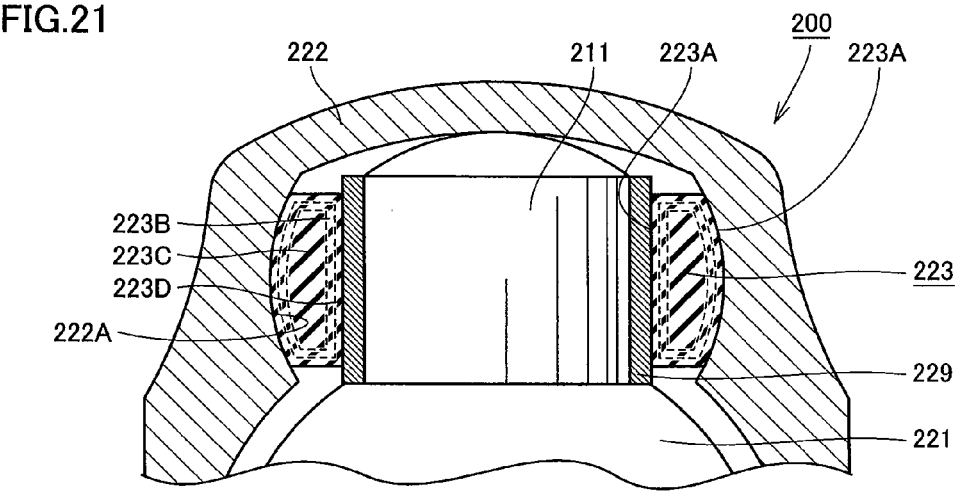
FIG. 21 is an enlarged schematic partial cross section of a main portion of FIG. 17.

Herein, with reference to FIG. 17 and FIG. 21, the present embodiment provides a torque transmission member for a universal joint, that is implemented as spherical roller 223, which corresponds to ball 113 of the seventh embodiment and similarly has an inner portion 223C, a high density layer (a spherical roller high density layer 223B) and a higher density layer (a spherical roller higher density layer 223D). Thus the present embodiment provides tripod joint 200 that is a universal joint including a torque transmission member for the universal joint (spherical roller 223) formed of a sintered β-sialon inexpensive and capable of reliably ensuring sufficient durability. Note that the universal joint implemented in the eighth embodiment as tripod joint 200 and the torque transmission member implemented in the eighth embodiment for the universal joint as spherical roller 223 that tripod joint 200 includes can be produced similarly as they are produced in the seventh embodiment.

Note that while in the above embodiment the present universal joint is exemplified by a fixed joint and a tripod joint, the present universal joint is not limited thereto. For example, the universal joint may be a double offset joint (DOJ), a free ring tripod joint (FTJ), a cross groove joint (LJ) or the like.

The present universal joint may have its race member formed of a material which is not particularly limited. For example it may specifically be Japanese Industrial Standard (JIS) S53C or similar carbon steel, SCR420, SCM420 or a similar carburizing steel. Furthermore, the present universal joint may have its race member formed of a material of ceramics such as silicon nitride and sialon (including β-sialon).

EXAMPLE 1

Hereinafter the present invention in an example 1 will be described. Rolling bearings having rolling elements formed of sintered β-sialon having a variety of values z are produced and tested to investigate the relationship between value z and rolling contact fatigue life (durability). The test is conducted in the following procedure:

Initially, bearings to be tested are produced in a method, as will be described hereinafter. Initially, combustion synthesis is employed to prepare powdery β-sialon having value z in a range of 0.1-4 and rolling elements having value z of 0.1-4 are produced in a method similar to that of producing a rolling element as described above in the first embodiment with reference to FIG. 4. More specifically, they are produced in a method, as follows: Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) are wet-mixed using a ball mill. Subsequently, a spray dryer is used to granulate the intermediate product to produce granulated powder. The granulated powder is introduced in a die and thus shaped to be a sphere, and furthermore, a cold isostatical press (CIP) is employed to apply pressure to obtain a spherically shaped body.

Subsequently, the shaped body is preliminarily, pressurelessly sintered and thereafter undergoes a HIP process at a pressure of 200 MPa in an atmosphere of nitrogen to produce a sintered spherical body. Then, the sintered spherical body is lapped to be a ⅜ inch ceramic ball (JIS grade: G5). It is then combined with a separately prepared bearing ring of bearing steel (JIS SUJ2) to produce a bearing of JIS type number 6206 (examples A-H of the present invention and comparative examples B-C). Furthermore, for comparison, a rolling element formed of silicon nitride, i.e., a rolling element having value z of 0 is also produced in a method similar to that for producing a rolling element formed of β-sialon as described above, and is assembled similarly in a bearing (a comparative example A).

The test is conducted in the following conditions: A bearing of JIS type number 6206 produced as described above undergoes a fatigue test such that it experiences a maximum contact pressure Pmax of 3.2 GPa and is rotated at 2000 rpm, using a lubricant of turbine oil VG68 (clean oil) circularly fed, and thus tested at room temperature. A vibration detector is employed to monitor how the bearing in operation vibrates, and after the bearing has a rolling element damaged when the bearing's vibration exceeds a predetermined value, the test is stopped, and a period of time having elapsed since the bearing started to operate until the test is stopped is recorded as the bearing's life. Furthermore, after the test is stopped, the bearing is disassembled to inspect how the rolling element is damaged.

TABLE 1

|  | Comp. Ex. A | Ex. A | Ex. B | Ex. C | Ex. D | Ex. E | Ex. F | Ex. G | Ex. H | Comp. Ex. B | Comp. Ex. C |
|---|---|---|---|---|---|---|---|---|---|---|---|
| Value z | 0 (Silicon Nitride) | 0.1 | 0.5 | 1 | 1.5 | 2 | 2.5 | 3 | 3.5 | 3.8 | 4 |
| Life Ratio | 1 | 1.05 | 1.05 | 1.05 | 1.01 | 0.99 | 0.95 | 0.9 | 0.74 | 0.12 | <0.05 |

TABLE 1-continued

| | Comp. Ex. A | Ex. A | Ex. B | Ex. C | Ex. D | Ex. E | Ex. F | Ex. G | Ex. H | Comp. Ex. B | Comp. Ex. C |
|---|---|---|---|---|---|---|---|---|---|---|---|
| Type of Damage | Flaked | Flaked | Flaked | Flaked | Flaked | Flaked | Flaked | Flaked | Flaked (Also Slightly Worn) | Flaked (Also Worn) | Worn |

Table 1 indicates a result of testing the present example. Table 1 indicates each example of the present invention and each comparative example having a life represented as a life ratio in comparison with comparative example A (silicon nitride) having a life represented as 1 (one). Furthermore, how a rolling element is damaged is recorded as "flaked" when it has a surface flaked, and as "worn" when it is not flaked and has a surface worn and accordingly the test is stopped.

With reference to table 1, examples A-H of the present invention having value z equal to or larger than 0.1 and equal to or smaller than 3.5 have life comparable to silicon nitride (comparative example A). Furthermore, examples A-H of the present invention also have damage similar to that of silicon nitride i.e., "flaked". In contrast, comparative example B having value z exceeding 3.5 and thus deviating from the present invention's range has a significantly reduced life and has a rolling element observed to be worn. More specifically, it is considered that although comparative example B having value z of 3.8 in the end has a rolling element flaked, the rolling element as it is worn has an effect resulting in a significantly reduced life. Furthermore, comparative example C having value z of 4 has a rolling element significantly worn in a significantly short period of time, and thus has the rolling bearing significantly impaired in durability.

Thus for value z in a range of 0.1 to 3.5 a rolling bearing including a rolling element formed of sintered sialon is substantially equivalent in durability to a rolling bearing including a rolling element formed of sintered silicon nitride. For value z exceeding 3.5, in contrast, a rolling bearing has a rolling element wearable, which results in a significantly reduced rolling contact fatigue life. Furthermore, it has been clarified that increased value z changes a cause of damage to a rolling element formed of β-sialon from "flaked" to "worn" and thus contributes to significantly reduced rolling contact fatigue life. Thus it has been confirmed that value z in a range of 0.1 to 3.5 allows a rolling bearing to be provided that includes a rolling element formed of a sintered β-sialon inexpensive and capable of reliably ensuring sufficient durability.

Note that with reference to table 1 example H of the present invention having value z exceeding 3, more specifically, value z of 3.5, has a rolling element slightly worn and also provides a life shorter than examples A-G of the present invention. It can be said therefrom that to more reliably ensure sufficient durability, value z equal to or smaller than 3 is desirable.

Furthermore, it can be seen from the above test result that, to obtain durability (or life) equivalent to that of a rolling element formed of silicon nitride, value z equal to or smaller than 2 is preferable, and value z equal to or smaller than 1.5 is more preferable. Furthermore, when combustion synthesis is adopted in a production process and accordingly, facilitating preparation of powdery β-sialon is considered, value z equal to or larger than 0.5 is preferable, as a reaction caused by a self heating effect can sufficiently be expected.

EXAMPLE 2

Hereinafter the present invention in an example 2 will be described. A test is conducted to inspect how the present rolling contact member and torque transmission member for a universal joint have a high density layer and a higher density layer formed, as seen in cross section. The test is conducted in the following procedure:

Initially, combustion synthesis is employed to prepare powdery β-sialon (product name: Meramix, produced by Isman J Corporation) having a composition of $Si_5AlON_7$, and therefrom a specimen in the form of a cube having each side of approximately 10 mm is produced in a method similar to that of producing a rolling contact member and a torque transmission member for a universal joint, as described in the third and seventh embodiments with reference to FIG. 9 and FIG. 20. More specifically, it is produced in a method, as follows: Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) are wet-mixed using a ball mill. Subsequently, a spray dryer is used to granulate the intermediate product to produce granulated powder. The granulated powder is introduced in a die and thus shaped to have a predetermined geometry, and furthermore, a cold isostatical press (CIP) is employed to apply pressure to obtain a shaped body. Subsequently the shaped body is heated in an atmosphere of nitrogen of a pressure of 0.4 MPa to 1650° C. and thus sintered to produce the above cubic specimen.

Subsequently, the specimen is cut and the cut surface is lapped with a diamond lap and thereafter mirror-lapped with a chromium oxide lap to obtain a cross section including a center of the cube for observation. The cross section is observed with an optical microscope (Microphoto-FXA produced by Nikon Corporation) with oblique illumination and imaged in an instant photograph (FP-100B produced by FUJIFILM Corporation) of a magnification of 50 times. Subsequently, the obtained photograph's image is taken in via a scanner (with a resolution of 300 dpi) to a personal computer. Image processing software (WinROOF produced by Mitani Corporation) is used to perform a binarization process by a brightness threshold value (in the present example, a binarizing separation threshold value: 140) to measure a white color portion for an area ratio.

The test provides a result, as described hereinafter. Note that FIG. 22 shows a photograph having an upper side showing a side of a specimen that is closer to a surface thereof, and a top end corresponding to the surface.

Figure 22:
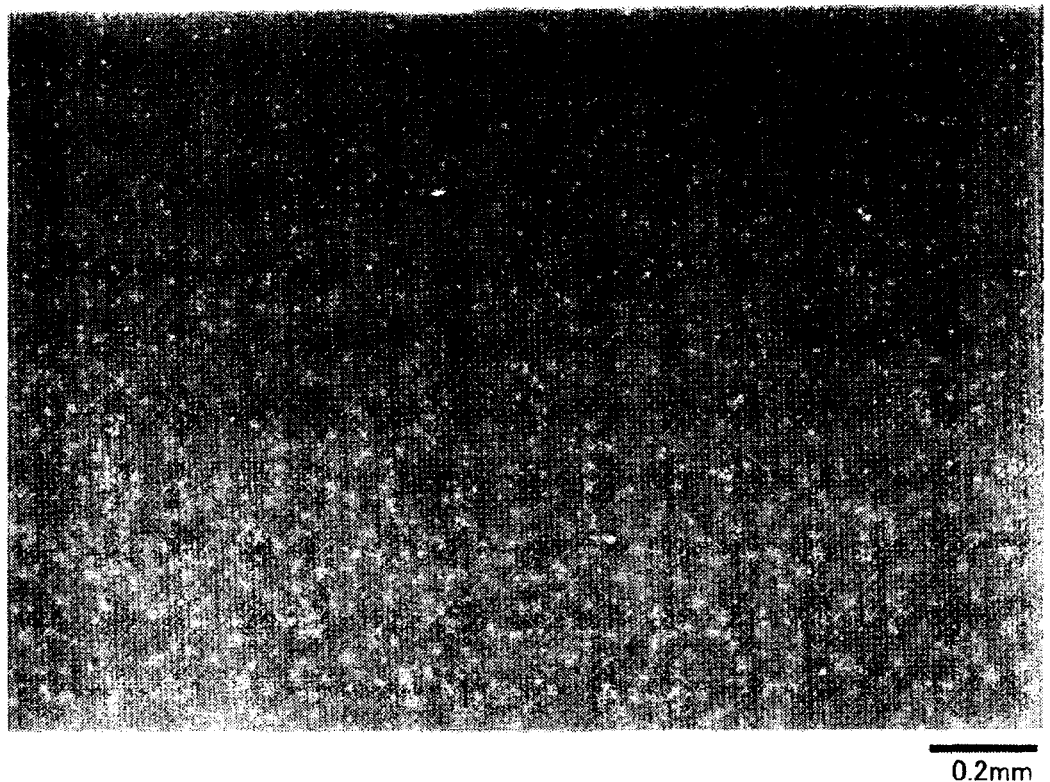
FIG. 22 is a photograph of a specimen for observation in cross section, as shot via an optical microscope with oblique illumination.
Figure 23:
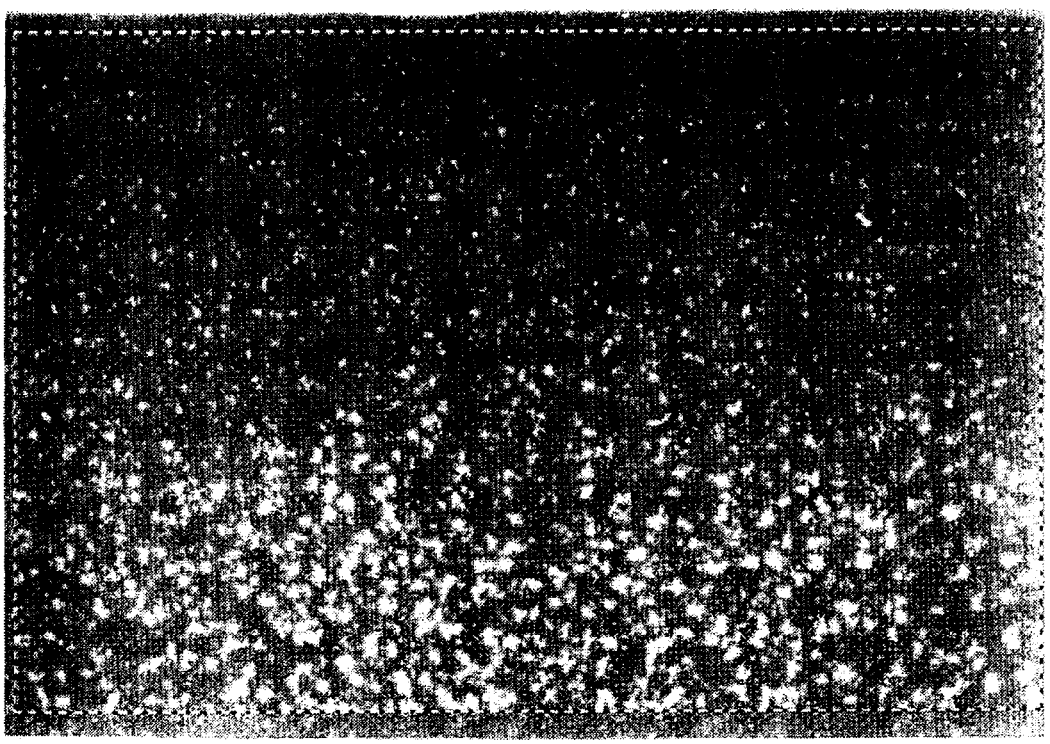
FIG. 23 shows one example of binarizing the FIG. 22 photographic image by a brightness threshold value using image processing software.
Figure 24:
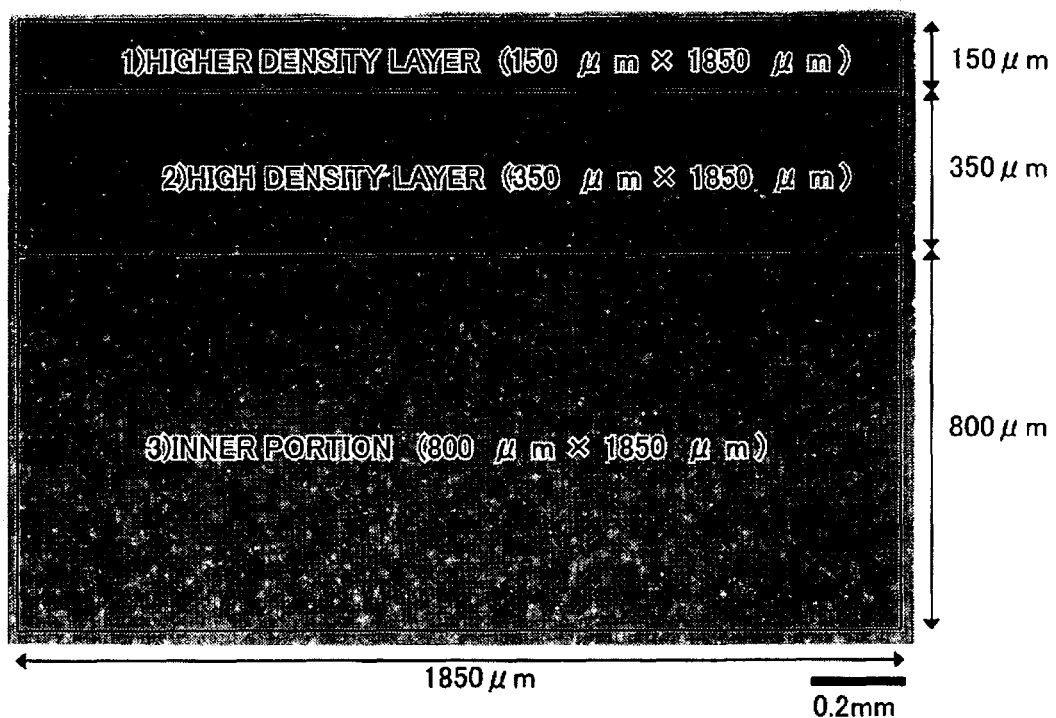
FIG. 24 shows a region subjected to an image process (a region to be evaluated) in binarizing the FIG. 22 photographic image by the brightness threshold value using the image processing software.

With reference to FIG. 22 and FIG. 23, it can be seen that a specimen in the present example produced in a method similar to that of producing the present rolling contact member and torque transmission member for a universal joint has in a portion including a surface a layer having a white color portion less than an inner portion does, and as shown in FIG. 24, a shot photograph's image is divided in accordance with a distance from an outermost surface of the specimen into three regions (i.e., a region from the outermost surface to a depth of 150 μm, a region that exceeds 150 μm and does not exceed 500 μm, and a region that exceeds 500 μm and does not exceed 800 μm), and each region is subjected to image analysis to calculate a white color portion for area ratio. A result shown in table 2 is obtained. In table 2, the FIG. 24 each shown region serves as one field of view, and from five randomly shot photographs, five fields of view are obtained. For each field, a white color portion is measured for area ratio, and their average and maximum values are indicated.

TABLE 2

| Depth from | Area Ratio of White Color Portion (%) | |
|---|---|---|
| Outermost Surface (μm) | Ave. of 5 Fields of View | Max. of 5 Fields of View |
| 1) Higher Density Layer 150 | 1.2 | 3.5 |
| 2) High Density Layer 150-500 | 3.7 | 7.0 |
| 3) Inner Portion >500 | 18.5 | 22.4 |

With reference to table 2, the present example provides a white color portion having an area ratio of 18.5% for an inner portion, and, in contrast, 3.7% for the region having a depth equal to or smaller than 500 μm from a surface, and 1.2% for the region having a depth equal to or smaller than 150 μm from the surface. It has been confirmed therefrom that a specimen produced in the present example in a method similar to that of producing the present rolling contact member and torque transmission member for a universal joint has in a portion including a surface a high density layer and a higher density layer having a white color portion less than an inner portion does.

EXAMPLE 3

Hereinafter the present invention in an example 3 will be described. A test is conducted to confirm the present rolling contact member's rolling contact fatigue life. The test is conducted in the following procedure:

Initially, a bearing to be tested is produced in a method, as will be described hereinafter. Initially, combustion synthesis is employed to prepare powdery β-sialon (product name: Meramix, produced by Isman J Corporation) having a composition of $Si_5AlON_7$, and therefrom a 3/8 inch ceramic ball having a diameter of 9.525 mm is produced in a method similar to that of producing a rolling contact member, as described in the third embodiment with reference to FIG. 9. More specifically, it is produced in a method, as follows: Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) are wet-mixed using a ball mill. Subsequently, a spray dryer is used to granulate the intermediate product to produce granulated powder. The granulated powder is introduced in a die and thus shaped to be a sphere, and furthermore, a cold isostatical press (CIP) is employed to apply pressure to obtain a spherically shaped body.

Then the shaped body is subjected to green body forming so that after it is sintered it has a predetermined working thickness. Subsequently the shaped body is heated in an atmosphere of nitrogen of a pressure of 0.4 MPa to 1650° C. and thus sintered to produce a sintered spherical body. Then the sintered spherical body is lapped to be a 3/8 inch ceramic ball (a rolling element; JIS grade: G5). It is then combined with a separately prepared bearing ring of bearing steel (JIS SUJ2) to produce a bearing of JIS type number 6206. Herein, the sintered spherical body is lapped to have a thickness (or a working thickness) removed in 8 levels to produce 8 types of bearings (examples A-H of the present invention). In contrast, for comparison, silicon nitride and a sintering additive are used to provide a powdery source material which is in turn pressure-sintered to provide a sintered spherical body (EC141 produced by NGK Spark Plug Co. Ltd.) which is in turn lapped, similarly as described above, and combined with a separately prepared bearing ring of bearing steel (JIS SUJ2) to produce a bearing of JIS type number 6206 (comparative example A). It is lapped by a thickness of 0.25 mm.

The test is conducted in the following conditions: A bearing of JIS type number 6206 produced as described above undergoes a fatigue test such that it experiences a maximum contact pressure Pmax of 3.2 GPa and is rotated at 2000 rpm, using a lubricant of turbine oil VG68 (clean oil) circularly fed, and thus tested at room temperature. A vibration detector is employed to monitor how the bearing in operation vibrates, and after the bearing has a rolling element damaged when the bearing's vibration exceeds a predetermined value, the test is stopped, and a period of time having elapsed since the bearing started to operate until the test is stopped is recorded as the bearing's life. Note that 15 bearings for each example of the present invention and the comparative example are tested and their $L_{10}$ lives are calculated and evaluated for durability by a life ratio in comparison with comparative example A.

TABLE 3

| | Working Thickness (mm) | $L_{10}$ Life (Time) | Life Ratio |
|---|---|---|---|
| Ex. A | 0.05 | 6492 | 3.19 |
| Ex. B | 0.10 | 6387 | 3.14 |
| Ex. C | 0.15 | 6404 | 3.15 |
| Ex. D | 0.20 | 3985 | 1.96 |
| Ex. E | 0.30 | 4048 | 1.99 |
| Ex. F | 0.40 | 3945 | 1.94 |
| Ex. G | 0.50 | 3069 | 1.51 |
| Ex. H | 0.60 | 867 | 0.43 |
| Comp. Ex. A | 0.25 | 2036 | 1.00 |

Table 3 shows a result of testing the present example. With reference to table 3, it can be said that the present example provides bearings all having satisfactory life with their production costs and the like considered. A working thickness set to be equal to or smaller than 0.5 mm to provide a rolling element having a surface with a high density layer remaining therein, i.e., the present invention in examples D-G, provides a bearing having a life approximately 1.5-2 times that of comparative example A. Furthermore, a working thickness set to be equal to or smaller than 0.15 mm to provide a rolling element having a surface with a higher density layer remaining therein, i.e., the present invention in examples A-C, provides a bearing having a life approximately 3 times that of comparative example A. It is thus confirmed that a rolling bearing including the present rolling contact member is excellent in durability, and it has been found that a rolling bearing including the present rolling contact member with a working thickness set to be equal to or smaller than 0.5 mm to have a surface with a high density layer remaining therein can have an increased life and a rolling bearing including the present rolling contact member with a working thickness set to be equal to or smaller than 0.15 mm to have a surface with a higher density layer remaining therein can have a further increased life.

EXAMPLE 4

Hereinafter the present invention in an example 4 will be described. Specimens formed of sintered β-sialon having a variety of values z are produced and tested to investigate the relationship between value z and durability against rolling and sliding contact fatigue. The test is conducted in the following procedure:

TABLE 4

| | Comp. Ex. A | Ex. A | Ex. B | Ex. C | Ex. D | Ex. E | Ex. F | Ex. G | Ex. H | Comp. Ex. B | Comp. Ex. C |
|---|---|---|---|---|---|---|---|---|---|---|---|
| Value z | 0 (Silicon Nitride) | 0.1 | 0.5 | 1 | 1.5 | 2 | 2.5 | 3 | 3.5 | 3.8 | 4 |
| Life Ratio | 1 | 1.03 | 1.04 | 1.03 | 1.02 | 0.99 | 0.96 | 0.93 | 0.79 | 0.16 | <0.05 |
| Type of Damage | Flaked | Flaked | Flaked | Flaked | Flaked | Flaked | Flaked | Flaked | Flaked (Also Slightly Worn) | Flaked (Also Worn) | Worn |

Initially, specimens to be tested are produced in a method, as will be described hereinafter. Initially, combustion synthesis is employed to prepare powdery β-sialon having value z in a range of 0.1-4 and specimens having value z of 0.1-4 are produced in a method similar to that of producing a torque transmission member for a universal joint as described above in the fifth embodiment with reference to FIG. 15. More specifically, they are produced in a method, as follows: Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) are wet-mixed using a ball mill. Subsequently, a spray dryer is used to granulate the intermediate product to produce granulated powder. The granulated powder is introduced in a die and thus shaped to be a cylinder, and furthermore, a cold isostatical press (CIP) is employed to apply pressure to obtain a cylindrically shaped body.

Subsequently, the shaped body is preliminarily, pressurelessly sintered and thereafter undergoes a HIP process in an atmosphere of nitrogen at a pressure of 200 MPa to produce a sintered cylindrical body. Then, the sintered cylindrical body has an outer circumferential surface lapped to provide a specimen in the form of a cylinder having a diameter of $\phi 40$ mm (examples A-H of the present invention and comparative examples B-C). Furthermore, for comparison, a specimen formed of silicon nitride, i.e., a specimen having value z of 0 is also produced in a method similar to that for producing a specimen formed of β-sialon as described above (comparative example A).

The test is conducted in the following conditions: Each specimen prepared as described above is brought into contact with a separately prepared another specimen formed of bearing steel (JIS SUJ2) (in the form of a cylinder having a diameter of $\phi 40$ mm and having been quench-hardened) such that they have their respective axes in parallel and each specimen experiences a maximum contact pressure Pmax of 2.5 GPa at its outer circumferential surfaces. Each specimen is rotated at 3000 rpm around the axis and the other specimen is rotated around the axis to slide relative to each specimen at a rate of 5%. With a lubricant of turbine oil VG68 (clean oil) fed via a pat, and at room temperature, each specimen is continuously rotated. A rolling and sliding fatigue test (a two-cylinder test) is thus conducted. A vibration detector is employed to monitor how each specimen in operation vibrates, and after each specimen is damaged when its vibration exceeds a predetermined value, the test is stopped, and a period of time having elapsed since each specimen started to operate until the test is stopped is recorded as the specimen's life. Furthermore, after the test is stopped, how each specimen is damaged is inspected.

Table 4 indicates a result of testing the present example. Table 4 indicates each example of the present invention and each comparative example having a life represented as a life ratio in comparison with a comparative example A (silicon nitride) having a life represented by 1 (one). Furthermore, how a specimen is damaged is recorded as "flaked" when it has a surface flaked, and as "worn" when it is not flaked and has a surface worn and accordingly the test is stopped.

With reference to table 4, examples A-H of the present invention having value z of 0.1 to 3.5 have life comparable to silicon nitride (comparative example A). Furthermore, examples A-H of the present invention also have damage similar to that of silicon nitride i.e., "flaked". In contrast, comparative example B having value z exceeding 3.5 and thus deviating from the present invention's range has a significantly reduced life and its specimen is observed to be worn. More specifically, it is considered that although comparative example B having value z of 3.8 in the end has its specimen flaked, the specimen as it is worn has an effect resulting in a significantly reduced life. Furthermore, comparative example C having value z of 4 has its specimen significantly worn in a significantly short period of time, and thus significantly impaired in durability.

Thus for value z in a range of 0.1 to 3.5 a specimen formed of sintered sialon is substantially equivalent in durability to a specimen formed of sintered silicon nitride. For value z exceeding 3.5, in contrast, a specimen is wearable, which results in significantly reduced durability against rolling and sliding contact fatigue. Furthermore, it has been clarified that increased value z changes a cause of damage to a specimen formed of β-sialon from "flaked" to "worn" and thus contributes to significantly reduced durability against rolling and sliding contact fatigue. Thus it has been confirmed that value z in a range of 0.1 to 3.5 allows a universal joint to be provided that includes a torque transmission member formed of a sintered β-sialon inexpensive and capable of reliably ensuring sufficient durability.

Note that with reference to table 4 example H of the present invention having value z exceeding 3, more specifically, value z of 3.5, has its specimen slightly worn and also provides a life shorter than examples A-G of the present invention. It can be said therefrom that to more reliably ensure sufficient durability, value z equal to or smaller than 3 is desirable.

Furthermore, it can be seen from the above test result that, to obtain durability (or life) equivalent to that of a torque transmission member formed of silicon nitride, value z equal to or smaller than 2 is preferable, and value z equal to or smaller than 1.5 is more preferable. Furthermore, when combustion synthesis is adopted in a production process and accordingly, facilitating preparation of powdery β-sialon is considered, value z equal to or larger than 0.5 is preferable, as a reaction caused by a self heating effect can sufficiently be expected.

EXAMPLE 5

Hereinafter the present invention in an example 5 will be described. A test is conducted to confirm the durability of a torque transmission member for a universal joint in accordance with the present invention against rolling and sliding contact fatigue. The test is conducted in the following procedure:

Initially, a specimen to be tested is produced in a method, as will be described hereinafter. Initially, combustion synthesis is employed to prepare powdery β-sialon (product name: Meramix, produced by Isman J Corporation) having a composition of $Si_5AlON_7$, and therefrom a specimen in the form of a cylinder having a diameter of ϕ40 mm is produced in a method similar to that of producing a torque transmission member for a universal joint, as described in the seventh embodiment with reference to FIG. 20. More specifically, it is produced in a method, as follows: Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) are wet-mixed using a ball mill. Subsequently, a spray dryer is used to granulate the intermediate product to produce granulated powder. The granulated powder is introduced in a die and thus shaped to be a cylinder, and furthermore, a cold isostatical press (CIP) is employed to apply pressure to obtain a cylindrically shaped body.

Then the shaped body is subjected to green body forming so that after it is sintered it has a predetermined working thickness. Subsequently the shaped body is heated in an atmosphere of nitrogen of a pressure of 0.4 MPa to 1650° C. and thus sintered to produce a sintered cylindrical body. Then the sintered cylindrical body has an outer circumferential surface lapped to provide a specimen in the form of a cylinder having a diameter of ϕ40 mm. Herein, the sintered cylindrical body is lapped to have a thickness (or a working thickness) removed in 8 levels to produce 8 types of specimens (examples A-H of the present invention). In contrast, for comparison, silicon nitride and a sintering additive are used to provide a powdery source material which is in turn pressure-sintered to provide a sintered cylindrical body which is in turn lapped, similarly as described above, to produce a specimen in the form of a cylinder having a diameter of ϕ40 mm (comparative example A). It is lapped by a thickness of 0.25 mm.

The test is conducted in the following conditions: Each specimen prepared as described above is brought into contact with a separately prepared another specimen formed of bearing steel (JIS SUJ2) (in the form of a cylinder having a diameter of ϕ40 mm and having been quench-hardened) such that they have their respective axes in parallel and each specimen experiences a maximum contact pressure Pmax of 2.5 GPa at its outer circumferential surfaces. Each specimen is rotated at 3000 rpm around the axis and the other specimen is rotated around the axis to slide relative to each specimen at a rate of 5%. With a lubricant of turbine oil VG68 (clean oil) fed via a pat, and at room temperature, each specimen is continuously rotated. A rolling and sliding fatigue test (a two-cylinder test) is thus conducted. A vibration detector is employed to monitor how each specimen in operation vibrates, and after each specimen is damaged when its vibration exceeds a predetermined value, the test is stopped, and a period of time having elapsed since each specimen started to operate until the test is stopped is recorded as the specimen's life. Note that 8 specimens for each example of the present invention and the comparative example are tested and their average lives are calculated and evaluated for durability by a life ratio in comparison with comparative example A.

TABLE 5

|  | Working Thickness (mm) | Life (Time) | Life Ratio |
| --- | --- | --- | --- |
| Ex. A | 0.05 | 1789 | 5.08 |
| Ex. B | 0.10 | 1762 | 5.01 |
| Ex. C | 0.15 | 1783 | 5.07 |
| Ex. D | 0.20 | 1068 | 3.03 |
| Ex. E | 0.30 | 957 | 2.72 |
| Ex. F | 0.40 | 829 | 2.36 |
| Ex. G | 0.50 | 713 | 2.03 |
| Ex. H | 0.60 | 321 | 0.91 |
| Comp. Ex. A | 0.25 | 352 | 1.00 |

Table 5 shows a result of testing the examples. With reference to table 5, it can be said that the examples of the present invention provide specimens all providing satisfactory life with their production costs and the like considered. A working thickness set to be equal to or smaller than 0.5 mm to provide a specimen having a surface with a high density layer remaining therein, i.e., the present invention in examples D-G, allows the specimen to have a life approximately 2-3 times that of comparative example A. Furthermore, a working thickness set to be equal to or smaller than 0.15 mm to provide a specimen having a surface with a higher density layer remaining therein, i.e., the present invention in examples A-C, allows the specimen to have a life approximately 5 times that of comparative example A. It is thus considered therefrom that a universal joint including a torque transmission member for the universal joint in accordance with the present invention is excellent in durability, and that the torque transmission member for the universal joint with a working thickness set to be equal to or smaller than 0.5 mm to have a surface with a high density layer remaining therein can provide an increased life and the torque transmission member for the universal joint with a working thickness set to be equal to or smaller than 0.15 mm to have a surface with a higher density layer remaining therein can provide a further increased life.

It should be understood that the embodiments and examples disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present rolling bearing, hub unit, rolling contact member and method of producing the same are advantageously applicable to rolling bearings, hub units adopting for a component a sintered body containing β-sialon as a main component, rolling contact members formed of a sintered body containing β-sialon as a main component, and methods of producing the same. Furthermore the present universal joint, torque transmission member for the universal joint, and method of producing the same are advantageously applicable to universal joints adopting for a component a sintered body containing β-sialon as a main component, torque transmission members for universal joints, formed of a sintered body containing β-sialon as a main component, and methods of producing the same.

The invention claimed is:

1. A rolling contact member in a rolling bearing, the rolling contact member being one of a race member and a rolling element disposed in contact with said race member on an annular raceway, the rolling contact member being configured of a sintered body that contains as a main component a β-sialon represented by a compositional formula of $Si_{6-z}Al_zO_zN_{8-z}$ and satisfying $0.1 \leq z \leq 3.5$ and has a remainder formed of an impurity, the rolling contact member having a rolling contact surface serving as a surface contacting another rolling contact member, said rolling contact surface being included in a portion having a high density layer higher in density than an inner portion, wherein said high density layer has a surface included in a portion having a higher density layer higher in density than another portion of said high density layer.

2. The rolling contact member according to claim 1, wherein when said high density layer is observed in cross section with an optical microscope with oblique illumination, said layer exhibits a portion observed as a portion white in color having an area ratio equal to or smaller than 7%.

3. The rolling contact member according to claim 1, wherein when said higher density layer is observed in cross section with an optical microscope with oblique illumination, said layer exhibits a portion observed as a portion white in color having an area ratio equal to or smaller than 3.5%.

4. A rolling bearing comprising:
a race member; and
a plurality of rolling elements disposed in contact with said race member on an annular raceway, at least one of said race member and said rolling element being the rolling contact member of claim 1.

5. A rolling contact member in a rolling bearing, the rolling contact member being one of a race member and a rolling element disposed in contact with said race member on an annular raceway, the rolling contact member being configured of a sintered body that contains as a main component a β-sialon represented by a compositional formula of $Si_{6-z}Al_zO_zN_{8-z}$ and satisfying $0.1 \leq z \leq 3.5$ and has a remainder formed of a sintering additive and an impurity, the rolling contact member having a rolling contact surface serving as a surface contacting another rolling contact member, said rolling contact surface being included in a portion having a high density layer higher in density than an inner portion, wherein said high density layer has a surface included in a portion having a higher density layer higher in density than another portion of said high density layer.

6. The rolling contact member according to claim 5, wherein when said high density layer is observed in cross section with an optical microscope with oblique illumination, said layer exhibits a portion observed as a portion white in color having an area ratio equal to or smaller than 7%.

7. The rolling contact member according to claim 5, wherein when said higher density layer is observed in cross section with an optical microscope with oblique illumination, said layer exhibits a portion observed as a portion white in color having an area ratio equal to or smaller than 15%.

8. A rolling bearing comprising:
a race member; and
a plurality of rolling elements disposed in contact with said race member on an annular raceway, at least one of said race member and said rolling element being the rolling contact member of claim 5.

9. A method of producing a rolling contact member in a rolling bearing, said rolling contact member being one of a race member and a rolling element disposed in contact with said race member on an annular raceway, comprising the steps of:

preparing a powdery source material that contains as a main component a β-sialon represented by a compositional formula of $Si_{6-z}Al_zO_zN_{8-z}$ and satisfying $0.1 \leq z \leq 3.5$ and has a remainder formed of an impurity;

shaping said powdery source material generally into a geometry of said rolling contact member to provide a shaped body;

sintering said shaped body at a pressure equal to or smaller than 1 MPa, wherein a rolling contact surface of the rolling contact member is included in a portion having a high density layer higher in density than an inner portion, and said high density layer has a surface included in a portion having a higher density layer higher in density than another portion of said high density layer.

10. The method of producing a rolling contact member according to claim 9, wherein the step of sintering said shaped body includes sintering said shaped body in a range of 1550° C. to 1800° C.

11. The method of producing a rolling contact member according to claim 9, wherein the step of sintering said shaped body includes sintering said shaped body in one of an atmosphere of an inert gas and an atmosphere of a gaseous mixture of nitrogen and oxygen.

12. The method of producing a rolling contact member according to claim 9, further comprising the step of forming a surface of said shaped body before sintering said shaped body.

13. The method of producing a rolling contact member according to claim 9, further comprising a step of working a surface of said shaped body sintered, to remove a portion including said surface, the step of working removing said shaped body by a thickness equal to or smaller than 150 μm.

14. A method of producing a rolling contact member in a rolling bearing, said rolling contact member being one of a race member and a rolling element disposed in contact with said race member on an annular raceway, comprising the steps of:

preparing a powdery source material that contains as a main component a β-sialon represented by a compositional formula of $Si_{6-z}Al_zO_zN_{8-z}$ and satisfying $0.1 \leq z \leq 3.5$ and has a remainder formed of a sintering additive and an impurity;

shaping said powdery source material generally into a geometry of said rolling contact member to provide a shaped body; and sintering said shaped body at a pressure equal to or smaller than 1 MPa, wherein a rolling contact surface of the rolling contact member is included in a portion having a high density layer higher in density than an inner portion, and said high density layer has a surface included in a portion having a higher density layer higher in density than another portion of said high density layer.

15. The method of producing a rolling contact member according to claim 14, wherein the step of sintering said shaped body includes sintering said shaped body in a range of 1550° C. to 1800° C.

16. The method of producing a rolling contact member according to claim 14, wherein the step of sintering said shaped body includes sintering said shaped body in one of an atmosphere of an inert gas and an atmosphere of a gaseous mixture of nitrogen and oxygen.

17. The method of producing a rolling contact member according to claim 14, further comprising the step of forming a surface of said shaped body before sintering said shaped body.

18. The method of producing a rolling contact member according to claim 14, further comprising a step of working a surface of said shaped body sintered, to remove a portion including said surface, the step of working removing said shaped body by a thickness equal to or smaller than 150 µm.

* * * * *